(12) United States Patent
Felsl et al.

(10) Patent No.: US 7,017,928 B2
(45) Date of Patent: Mar. 28, 2006

(54) BICYCLE

(76) Inventors: Andreas Felsl, Zugspitzstrasse 10, Haar/Gronsdorf, D-85540 (DE); Stephan Albrecht, Heigenkam 1, Warngau, D-83627 (DE)

( * ) Notice: Subject to any disclaimer, the term of this patent is extended or adjusted under 35 U.S.C. 154(b) by 0 days.

(21) Appl. No.: 10/675,389

(22) Filed: Sep. 30, 2003

(65) Prior Publication Data

US 2004/0061303 A1   Apr. 1, 2004

Related U.S. Application Data

(60) Division of application No. 10/246,595, filed on Sep. 18, 2002, now Pat. No. 6,688,626, which is a continuation of application No. PCT/EP01/00074, filed on Jan. 5, 2001.

(30) Foreign Application Priority Data

Mar. 20, 2000  (DE) .......................... 200 05 224 U
May 25, 2000  (DE) .............................. 100 25 901

(51) Int. Cl.
   *B62K 25/04* (2006.01)
(52) U.S. Cl. ..................... 280/276; 280/283; 267/124
(58) Field of Classification Search ................ 280/275, 280/276, 277, 283, 284, 285, 286; 267/120, 267/113, 118, 124, 126, 127
See application file for complete search history.

(56) References Cited

U.S. PATENT DOCUMENTS

| 2,115,072 A | 4/1938 | Hunt et al. ................. 267/15 |
| 3,861,740 A | 1/1975 | Tajima et al. ............... 297/195 |
| 4,159,105 A | 6/1979 | Vander Laan et al. ...... 267/8 R |
| 4,582,343 A | 4/1986 | Waugh ....................... 280/284 |
| 4,679,811 A * | 7/1987 | Shuler ........................ 280/284 |
| 4,735,276 A | 4/1988 | Burton ....................... 180/219 |
| 4,881,750 A * | 11/1989 | Hartmann ................... 280/276 |
| 5,086,866 A | 2/1992 | Banjo et al. ................ 180/219 |
| 5,248,159 A * | 9/1993 | Moore ........................ 280/276 |
| 5,320,375 A * | 6/1994 | Reeves et al. .............. 280/284 |
| 5,348,112 A | 9/1994 | Vaillancourt ............... 180/227 |
| 5,447,332 A | 9/1995 | Heyring ..................... 280/772 |
| 5,634,653 A * | 6/1997 | Browning ................... 280/276 |
| 5,803,482 A * | 9/1998 | Kim ..................... 280/124.157 |
| 5,860,660 A | 1/1999 | Garcia ........................ 280/201 |
| 5,911,428 A * | 6/1999 | Ueda et al. ................. 280/276 |
| 5,971,116 A * | 10/1999 | Franklin ................... 188/282.4 |
| 5,996,745 A * | 12/1999 | Jones et al. ............... 188/266.7 |
| 6,044,940 A | 4/2000 | Marzocchi et al. ....... 188/299.1 |
| 6,286,642 B1 * | 9/2001 | Yi ............................ 188/319.2 |
| 6,382,370 B1 * | 5/2002 | Girvin ..................... 188/299.1 |
| 6,585,215 B1 * | 7/2003 | Duncan ....................... 248/407 |

(Continued)

FOREIGN PATENT DOCUMENTS

DE    31 06 122 A1    12/1981

(Continued)

*Primary Examiner*—Kevin Hurley
(74) *Attorney, Agent, or Firm*—Heslin Rothenberg Farley & Mesiti P.C.

(57) ABSTRACT

A bicycle in one embodiment includes a frame and at least one adjusting device for adjusting at least one of a height of a saddle and a steering stem. The adjusting device includes a double-acting piston/cylinder assembly with a first cylinder chamber and a second cylinder chamber, which are separated from each other by a piston. An area of the piston limiting the first cylinder chamber being larger than the area of the piston limiting the second cylinder chamber. A locking device is proved for locking the piston.

9 Claims, 18 Drawing Sheets

U.S. PATENT DOCUMENTS

| | | | |
|---|---|---|---|
| 6,592,108 B1 | 7/2003 | Lüde | 267/64.28 |
| 2001/0030408 A1* | 10/2001 | Miyoshi | 280/276 |
| 2002/0008339 A1* | 1/2002 | Ogura | 267/64.16 |

FOREIGN PATENT DOCUMENTS

| | | |
|---|---|---|
| DE | 41 23 643 A | 6/1992 |
| DE | 41 01 745 A1 | 7/1992 |
| DE | 43 34 392 A1 | 4/1995 |
| DE | 298 10 431 U | 11/1999 |
| DE | 198 55 161 C1 | 2/2000 |
| DE | 100 01 692 A 1 | 8/2000 |
| DE | 199 53 901 A1 | 7/2001 |
| EP | 0 594 817 | 11/1993 |
| GB | 1182262 | 2/1970 |
| GB | 1490111 | 10/1977 |
| WO | WO 93/21056 | 10/1993 |
| WO | WO 93/23283 | 11/1993 |
| WO | WO 97/29007 | 8/1997 |
| WO | WO 99/03721 | 1/1999 |

* cited by examiner

BICYCLE

CROSS-REFERENCE TO RELATED APPLICATIONS

This application is a divisional patent application of U.S. patent application Ser. No. 10/246,595 filed on Sep. 18, 2002, entitled "BICYCLE," now issued as U.S. Pat. No. 6,688,626, which is a continuation of PCT application PCT/EP01/00074, filed Jan. 5, 2001, designating the United States, and published in German as PCT WO 01/70563 on Sep. 27, 2001. PCT application PCT/EP01/00074 claimed the priority of German patent application DE 200 05 224.1, filed Mar. 20, 2000, and German patent application DE 100 25 901.4, filed May 25, 2000. The entire disclosures of these applications are incorporated herein by reference.

DESCRIPTION

Such a bicycle is known from WO 99/03721. The bicycle described there comprises a pneumatically sprung front fork with two fork arms as well as a pneumatically sprung rear-wheel suspension, each being formed by double-acting pneumatic cylinders. A piston positioned inside the cylinder divides each of the pneumatic cylinders into a first cylinder chamber and a second cylinder chamber. The first cylinder chamber forms a first gas-pressurized spring and counteracts a "springing in" of the fork or of the rear-wheel suspension, respectively, and the second cylinder chamber forms a second gas-pressurized spring that counteracts a "springing out". The pneumatic cylinders each comprise valves for the separate filling or ventilating, respectively, of the first and second cylinder chambers, which enables a length adjustment or a variation of the "spring strength", respectively.

DE 298 10 431 U1 discloses a so-called mountain bike that is in particular suited for riding on hilly ground. It comprises a sprung front fork with telescopic fork arms, the length of which is adjustable in steps. Each fork arm comprises a locking pin for fixing the adjusted "fork length" or "fork height", respectively. In the interior of the telescopic fork arms, a helical spring is positioned which at least partially buffers shocks that are introduced via the front wheel, and thus improves the riding comfort. The rear wheel is mounted on a swing arm rear suspension that is pivotable around the pedal bearing axis and that is supported toward the frame by a shock-absorbing leg that takes up pressure forces. The shock-absorbing leg is fastened to the frame by means of quick release means, with several "fastening points" being provided, which enables a step-wise adjustment of the angle between the swing arm rear suspension and the frame, i.e. a step-wise "height adjustment" of the rear wheel. Due to the individual "adjustability in height" of the front wheel suspension and the rear wheel suspension, an approximately horizontal sitting position can be adjusted both when riding uphill and when riding downhill. It is of advantage in particular when riding downhill that the front wheel is "extended" and the rear wheel is "retracted" since this causes the center of gravity to be transferred backwards and the risk of overturning on actuation of the front wheel brake to be reduced. Furthermore, it is of advantage when riding uphill that the front spring element is retracted and the rear one is extended in order to transfer the cyclist's center of gravity further to the front. The cyclist thus takes up a more relaxed position which increases the efficiency when riding uphill.

DE 41 01 745 A1 discloses a bicycle with a sprung swing arm rear suspension that is connected with the bicycle frame via a resilient spring element, wherein a locking device comprising a cable pull is provided for locking the suspension.

U.S. Pat. No. 6,044,940, U.S. Pat. No. 2,115,072, and U.S. Pat. No. 4,159,105 disclose pneumatic or hydraulic piston/cylinder assemblies that are used as spring or damping elements, respectively.

Furthermore, DE 198 55 161 C1 discloses a height adjusting device comprising a tension spring for adjusting the height of a seat pillar of a bicycle.

U.S. Pat. No. 5,086,866 discloses an off-road motorcycle, wherein the front-wheel and the rear-wheel suspensions can be adjusted in height by means of a hydraulic lifting device, with a pressure generating device being provided for generating a hydraulic pressure. The height adjustment of the front-wheel suspension and the rear-wheel suspension is performed simultaneously, so that the frame remains in a substantially horizontally orientated.

U.S. Pat. No. 4,735,276 discloses a racing motorcycle comprising a front fork that is pneumatically adjustable in height, wherein the fork is completely lowered prior to the start so as to avoid taking off of the front wheel during the starting phase. During riding, the front wheel is pneumatically extended to normal height.

It is an object of the present invention to provide a multi-purpose adjusting device that can be adjusted easily and comfortably, in particular for adjusting the height of the front-wheel suspension, the rear-wheel suspension, the saddle or the steering stem, respectively, of a bicycle.

The basic principle of the invention consists in a mechanical adjusting device comprising at least one double-acting piston/cylinder assembly which can be extended "automatically".

In a first basic variant of the invention, at least two adjusting devices are provided, e.g. the height adjusting devices of the front-wheel suspension and of the rear-wheel suspension, which are coupled such that the rear wheel is "automatically extended" when the front wheel is "retracted", and vice versa.

The adjusting devices for the height adjustment of the front-wheel and rear-wheel suspensions each comprise at least one double-acting piston/cylinder assembly with respective "plus chambers" and "minus chambers" which are coupled via pressurizing medium lines and at least one shut-off device. For adjusting the riding inclination, the shut-off device is opened. By pressing down the handle bar or by weight transfer of the cyclist, respectively, the piston/cylinder assembly of the front wheel is retracted, this causing the "front wheel height" to be reduced and the piston/cylinder assembly of the rear wheel to be extended. Pressurizing medium thus flows from the plus chamber of the "front" piston/cylinder assembly to the plus chamber of the "rear" piston/cylinder assembly and from the minus chamber of the rear piston/cylinder assembly to the minus chamber of the front one. The "plus circuit" and the "minus circuit" may have approximately equal pressures.

Vice versa, by pressing down the frame in the rear section, the piston/cylinder assembly of the rear wheel can be retracted and the piston/cylinder assembly of the front wheel can be extended, this elongating the front fork and the range of spring. After the adjustment has been effected, the shut-off device will be closed again.

According to a further development of the invention, the piston/cylinder assemblies and the pressurizing medium lines are filled with a gas, e.g. with air. The piston/cylinder assemblies then additionally serve as "pneumatic shock-absorbing legs", this increasing the riding comfort, in particular during off-road uphill or downhill riding.

In accordance with a further development of the invention, a locking device is provided for locking the piston/cylinder assembly of the rear wheel. Optionally, a corresponding locking device may also be provided for the piston/cylinder assembly of the front wheel. The locking device may, for instance, be a double-acting hydraulic cylinder that is integrated into the housing of the piston/cylinder assembly intended for height adjustment, and that is e.g. filled with oil. Two chambers of the hydraulic cylinder are connected with one another via a hydraulic line and a shut-off device, wherein "hydraulic" locking is possible by shutting off the shut-off device. As an alternative to a double-acting hydraulic cylinder, a mechanical locking device may also be provided. The hydraulic cylinder also may have one chamber only which is connected with a hydraulic reservoir via a check valve.

According to a further development of the invention, one shut-off device is provided in each of the two pressurizing medium lines that connect the piston/cylinder assemblies. Preferably, these tow shut-off devices can be actuated by a common actuator. Furthermore, one single actuator may be provided for the shut-off devices and the locking device. Furthermore, both pressurizing medium lines may be connected with one another via a bypass line that can be shut off, so as to compensate the pressure in both pressure circuits.

In accordance with a further development of the invention, a spring element is provided at the front-wheel suspension and/or at the rear-wheel suspension. Springiness may be achieved by pneumatic piston/cylinder assemblies and/or by separate or additional spring elements. The spring means of the front-wheel and/or the rear-wheel suspensions thus can be "decoupled" from adjusting devices. In the case of "separately" provided spring means, the height adjustment could also be effected hydraulically. As spring elements, e.g. compression springs or elastomer elements may be used. The mechanical spring elements may also be integrated into the piston/cylinder assembly of the front-wheel or rear-wheel suspensions, respectively. A spring element may, for instance, be incorporated into the plus chamber of the piston/cylinder assembly. In the case of strong shocks, where the "pneumatic" range of spring is made full use of, an additional mechanical spring effect thus can be achieved. Alternatively, an arrangement outside the piston/cylinder assembly is also possible.

According to a further development of the invention, a filling/draining valve is provided for filling or draining, respectively, the piston/cylinder assemblies or the pressurizing medium lines, respectively. The filling valve may be a check valve that opens with a predetermined pressure only, wherein the pressure can be adjustable. The "pneumatic spring strength" thus can be adjusted in accordance with the weight of the cyclist and the desired riding comfort. Preferably, a compressed-air reservoir, e.g. a compressed-air cylinder, is provided, which may be integrated in the bicycle frame, which is very space-saving. Additionally, a compressed-air generator may be provided, which is preferably arranged such that ambient air is sucked in and pressed into the compressed-air reservoir or the piston/cylinder assemblies, respectively, by springing in of the front wheel or of the rear wheel, respectively. A compressed-air generator functioning according to the principle of an air pump may, for instance, be used.

In accordance with a further development of the invention, the bicycle comprises a fork, wherein both fork arms each are formed by a piston/cylinder assembly. The rear wheel may be mounted on a swing arm rear suspension that is connected with the frame via a lag hinge and the piston/cylinder assembly for height adjustment of the rear wheel.

In a second basic variant of the invention, two cylinder chambers of the piston/cylinder assembly that are separated from each other by a piston, i.e. a "plus chamber" and a "minus chamber", can be connected with one another via a fluid channel, this causing a pressure compensation to be effected.

At one of the two sides of the piston, a piston rod is fastened, which stands out from the piston/cylinder assembly and can be shifted axially. Thus, the size of the effective piston area of the plus chamber differs from the effective piston area of the minus chamber, namely by the cross-sectional area of the piston rod. Due to the differing sizes of the effective piston areas, a "difference force" on the piston or the piston rod, respectively, results even when the pressure in the two cylinder chambers is equally high, which enables an automatic extending of the adjusting devices.

In a third basic variant of the invention, effective piston areas of different sizes are also allocated to the two cylinder chambers, but the cylinder chambers here are permanently separated from one another by the piston. Furthermore, a locking device for locking the piston is always provided in this basic variant. This variant thus is particularly suited as adjusting device for a saddle or a steering stem, respectively, of a bicycle, where mechanical locking is absolutely necessary.

The adjusting device according to the invention can be used for many purposes, e.g. for the height adjustment of the front-wheel suspension, the rear-wheel suspension, the saddle or the steering stem. A substantial advantage consists in that the adjusting device is automatically extendable by pressure energy that is stored in the piston/cylinder assembly.

In the following, the invention will be explained in detail by means of embodiments in connection with the drawings, in which.

Figure 1:
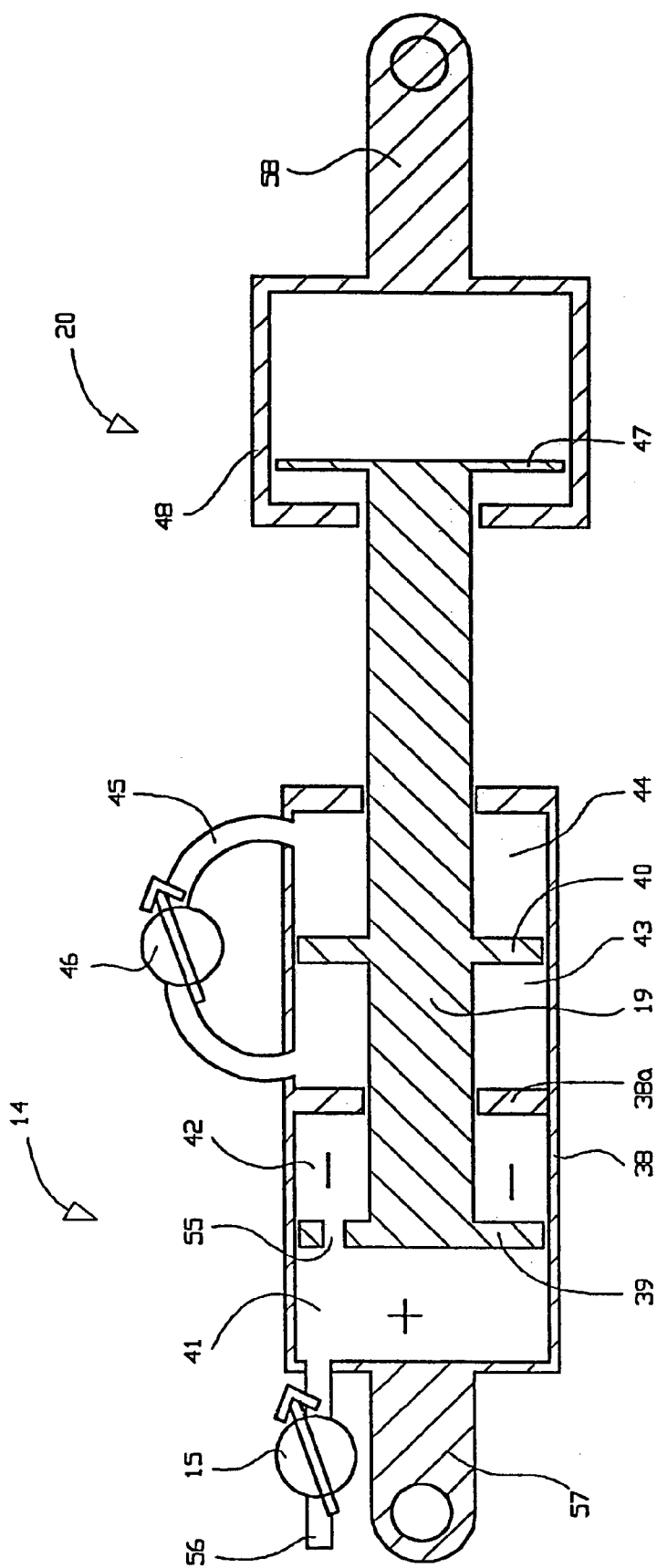
FIG. 1 shows a first embodiment of an adjusting device according to the invention.

FIG. 1 shows an adjusting device formed by a piston cylinder assembly 14, and a spring or damper element 20 "axially" connected therewith. The piston cylinder assembly 14 comprises a cylinder housing 38 which incorporates a piston rod 19. The piston rod 19 comprises a pneumatic piston 39 at its free end portion and a hydraulic piston 40 spaced apart from the pneumatic piston 39. The pneumatic piston 39 divides the cylinder housing 38 into a first pneumatic cylinder chamber 41, which is referred to as "plus chamber", and a second pneumatic cylinder chamber 42, which is referred to as "minus chamber", with a passage opening 55 being provided in the pneumatic piston 39 to connect the plus chamber 41 and the minus chamber 42 with one another. Consequently, the same pressure prevails in the plus chamber 41 and in the minus chamber 42. The second pneumatic cylinder chamber 42 is limited by the pneumatic piston 39, the cylinder housing 38 and a housing wall 38a that comprises a piston opening which the piston rod 19 passes through.

Furthermore, a filling junction 56 is provided that can be shut off via a check valve 15 and that enables a filling of the plus chamber 41 or of the minus chamber 42, respectively, connected therewith. Furthermore, a hinged bracket 57 is provided externally at the cylinder housing 38, through which the adjusting device can be flexibly connected with some other component, e.g. the frame of a bicycle.

When comparing the plus chamber 41 and the minus chamber 42, it becomes apparent that the plus chamber 41 has the shape of a circular cylinder and the minus chamber 42 the shape of an annular cylinder that is limited by the inner side of the cylinder housing 38 and the piston rod 19. In other words, the piston area of the plus chamber 41 is larger by the cross-sectional area of the piston rod 19 than the piston area of the minus chamber 42. When a pressure above atmospheric pressure prevails in the plus chamber 41 and in the minus chamber 42, a piston force results from the "cross-sectional area difference" of the piston areas of the plus chamber 41 and the minus chamber 42 that is equal to the product of the pressure prevailing in the plus chamber 41 or in the minus chamber 42, respectively, and the cross-sectional area of the piston rod 19 (friction forces have not been taken into account here). Provided that the piston rod 19 is freely shiftable in the cylinder housing 38, it thus is always pushed to an "extended" position due to the resulting pressure force, i.e. to the "right" with respect to the cylinder housing 38.

The hydraulic piston 40 further divides the cylinder housing 38 into a first hydraulic cylinder chamber 43 and a second hydraulic cylinder chamber 44, which are e.g. filled with oil. The two hydraulic cylinder chambers 43, 44 are connected with one another via a hydraulic line 45 that can be shut off by means of a check valve 46.

The piston rod 19 stands out from the cylinder housing 38 through an opening in the housing in the section of the second hydraulic cylinder chamber 44 and comprises at its other free end portion a spring piston 47 which is incorporated in a housing 48 of the spring element 20. The "adjusting device", i.e. the piston/cylinder assembly 14, thus is "decoupled" from the spring means 20. In the interior of the housing 48, a mechanical spring or an elastomer element may, for instance, be arranged. The housing 48 comprises a hinged bracket 58 for flexible connection with some other component, e.g. with the swing arm rear suspension of a bicycle.

In the following, the functioning will be explained in detail.

When the check valve 46 is closed, the piston rod is "locked" due to the incompressibility of the hydraulic fluid in the hydraulic cylinder chambers 43, 44, i.e. the hydraulic cylinder acts as a locking device. The assembly shown thus only has an axial degree of freedom left, namely the longitudinal elasticity of the spring element 20.

When the check valve 46 is opened, the piston rod 19 is freely shiftable in the cylinder housing 38. Unless any "external forces" are exerted on the hinged brackets 57, 58, the piston rod automatically extends due to the resulting pressure force as explained above, the resulting pressure force being proportional to the pressure prevailing in the plus chamber 41 or the minus chamber 42, respectively. By exerting axial pressure forces on the hinged brackets 57, 58, the piston rod 19 may be pushed into the cylinder housing 38 and, by closing the check valve 46, may infinitely variably be "locked" hydraulically.

The adjusting device thus can be used universally, in particular with a bicycle for the height adjustment of a wheel suspension, of the saddle, the steering stem etc., which will be explained in detail still.

Figure 2:
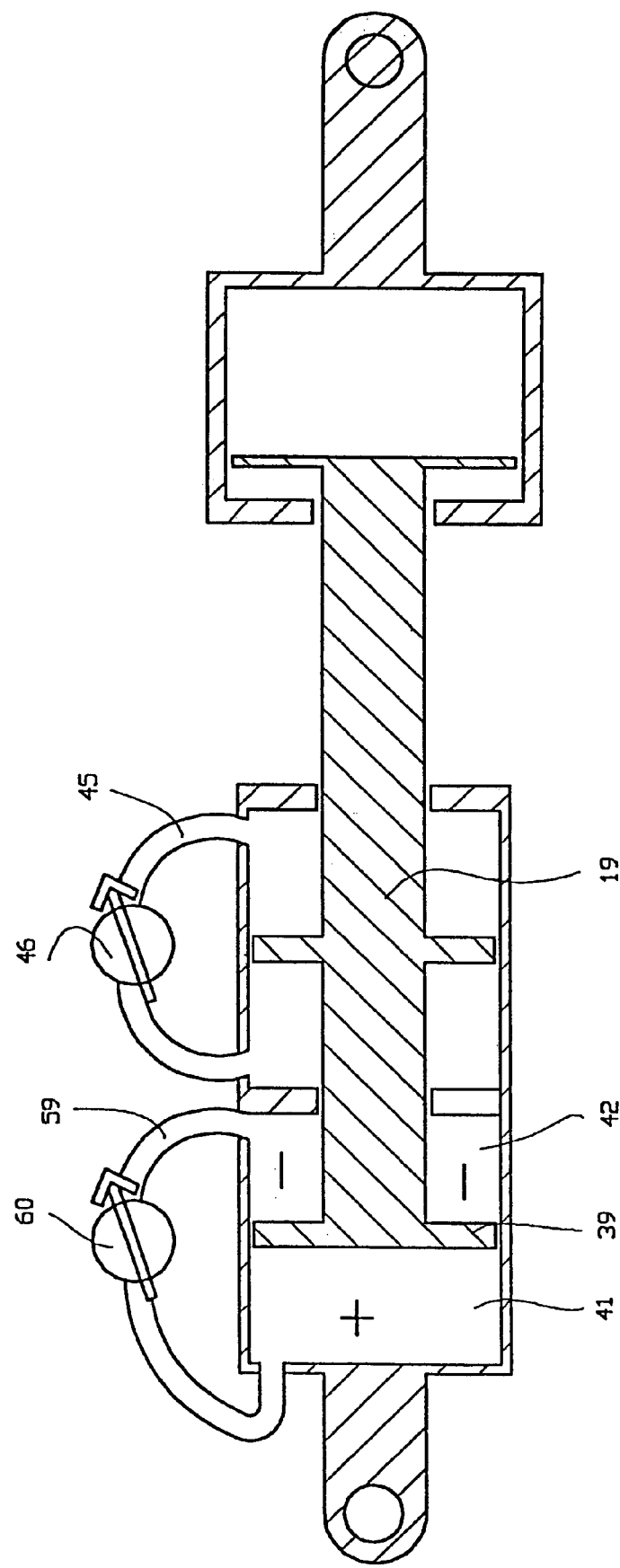
FIG. 2 shows a second embodiment of an adjusting device according to the invention.

FIG. 2 shows a variant of the embodiment of FIG. 1, where the plus chamber 41 and the minus chamber 42 are connected with one another via an "external" pneumatic line 59 and a check valve 60. When the check valve 46 of the hydraulic line 45 is opened and the check valve 60 is closed, a balance of powers occurs at the pneumatic piston 19, wherein the pneumatic piston 39 assumes a neutral position between its two end positions. When the check valve 60 is additionally opened, so that a pressure compensation between the plus chamber 41 and the minus chamber 42 can take place, the pneumatic piston extends completely, i.e. it assumes its "right" end position. The check valve 60 or the pneumatic line 59, respectively, may further comprise a filling junction (not illustrated) for filling the plus chamber 41 or the minus chamber 42, respectively.

Figure 3:
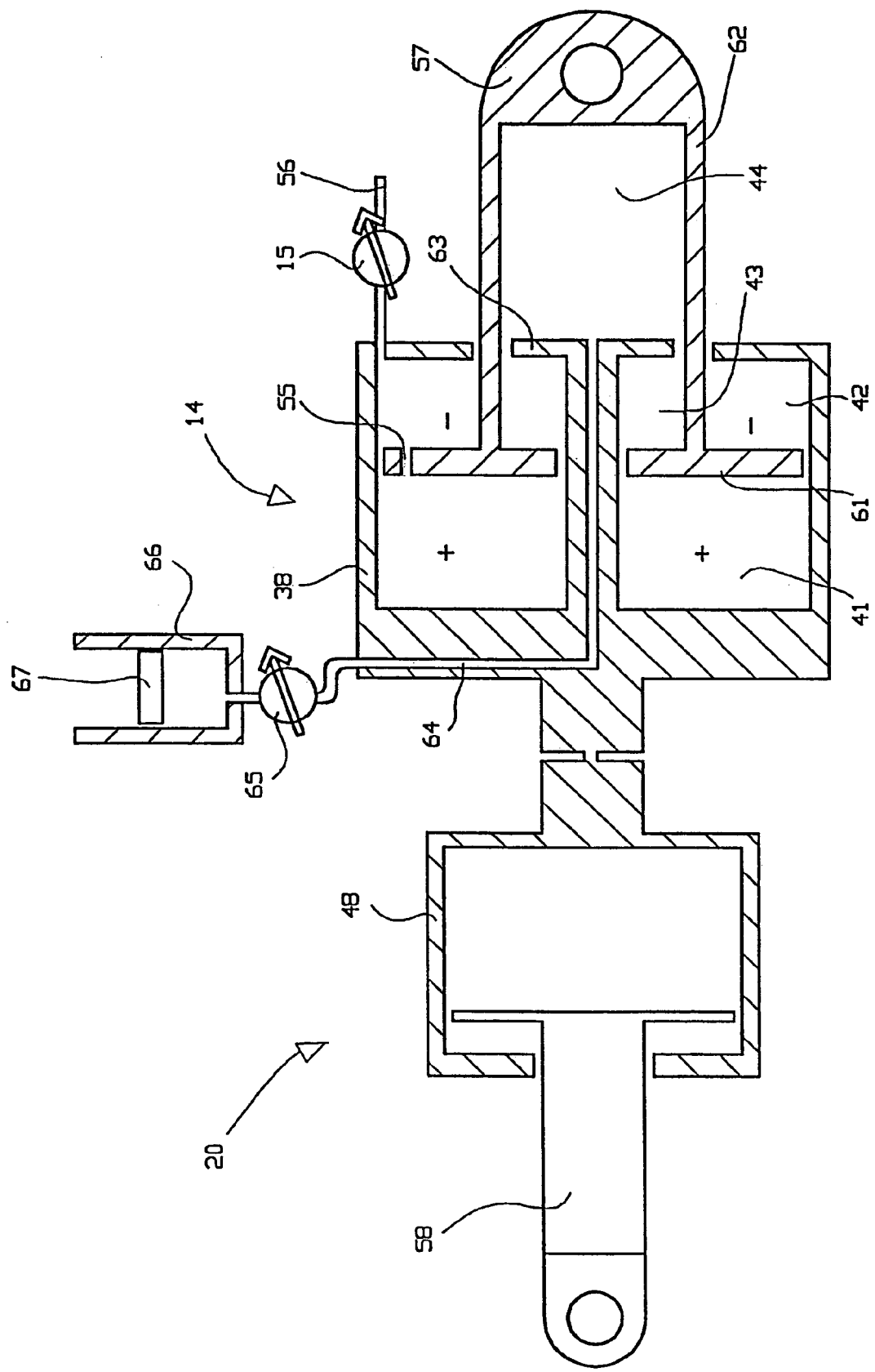
FIG. 3 shows an embodiment of an adjusting device with a hydraulic locking device and a compensation reservoir.

FIG. 3 shows an embodiment in which also a piston/cylinder assembly 14 and a spring element 20 are provided. The cylinder housing 38 and the housing 48 of the spring element in this case are integrally connected with one another. As an alternative, a coupling joint (not illustrated) may also be provided. Such a variant with a coupling joint will be explained in connection with FIG. 11.

The cylinder housing 38 incorporates a piston 61 of a piston element 62. The piston element 62 or the piston 61, respectively, divide the cylinder housing 38 into an annular plus chamber 41 and an annular minus chamber 42 which, in analogy with the embodiments of FIGS. 1 and 2, is allocated a smaller area of the piston 61 than the plus chamber 41. In analogy with FIG. 1, the piston 61 comprises a passage opening 55 that connects the plus chamber 41 and the minus chamber 42 with one another. Furthermore, a filling junction 56 as well as an allocated check valve 15 are provided here, too.

The cylinder housing 38 in this case comprises a piston-shaped element 63 which is incorporated in the piston element 62 and is component of a hydraulic piston/cylinder assembly with a first hydraulic cylinder chamber 43 and a second hydraulic cylinder chamber 44. In analogy with FIGS. 1 and 2, respectively, the two hydraulic cylinder chambers 43, 44 are connected with one another via a hydraulic line and a check valve, which is not illustrated here. The hydraulic line and the check valve may, for instance, be arranged in a plane perpendicular to the drawing plane.

The second hydraulic cylinder chamber 44 further is, via a hydraulic line 64 provided in the cylinder housing 38 and a hydraulic check valve 65, in connection with a compensation reservoir that is illustrated only schematically as housing 66 with a float 67. The compensation reservoir 66 is necessary since differently sized piston areas of the piston-shaped end portion 63 are allocated to the hydraulic cylinder chambers 43, 44, i.e. when the piston element 62 is shifted, a greater volume has to flow off the one hydraulic cylinder chamber than flows into the other hydraulic cylinder chamber. The "difference volume" then flows into the compensation reservoir 66 or from the compensation reservoir 66 into one of the two hydraulic cylinder chambers, respectively. By shutting off the check valve 65, the piston element 62 may be "locked", with a "volume compensation" via the compensation reservoir 66 being prevented. When, however, the check valve 65 is open, an unhindered "length adjustment", i.e. a shifting of the piston element 62 in the cylinder housing 38, is possible, with the piston element 62 extending "automatically" in this case, too, when the pressure prevailing in the cylinder chambers 41, 42 is higher than the atmospheric pressure and no or only minor external pressure forces are applied.

As an alternative to the embodiment described above, the two cylinder chambers 43, 44 need not necessarily be connectable with one another via a hydraulic line. The cylinder chamber 43 my also be filled with a gas or with air, respectively, which results in excess pressure or negative pressure, respectively, occurring when the piston element 62 is shifted in the cylinder chamber 43. Alternatively, the cylinder chamber 43 may also be open towards the atmosphere, so that an unhindered exchange of air is possible. In the two latter-mentioned variants, it is not a "difference volume", but the entire hydraulic fluid volume that flows into the compensation reservoir 66 or from the compensation reservoir 66 to the cylinder chamber 44, respectively, when the piston element 62 is shifted. The two latter-mentioned variants further have the advantage that the effective area of the piston-shaped end portion 63 is larger than in the variant described above. In other words, the piston area generating the hydraulic pressure is larger and thus bears higher forces in the case of minor pressure.

In analogy with FIGS. 1 and 2, hinged brackets 57, 58 are provided here, too, through which the adjusting device is flexibly connectable with other components of a bicycle.

Figure 4:
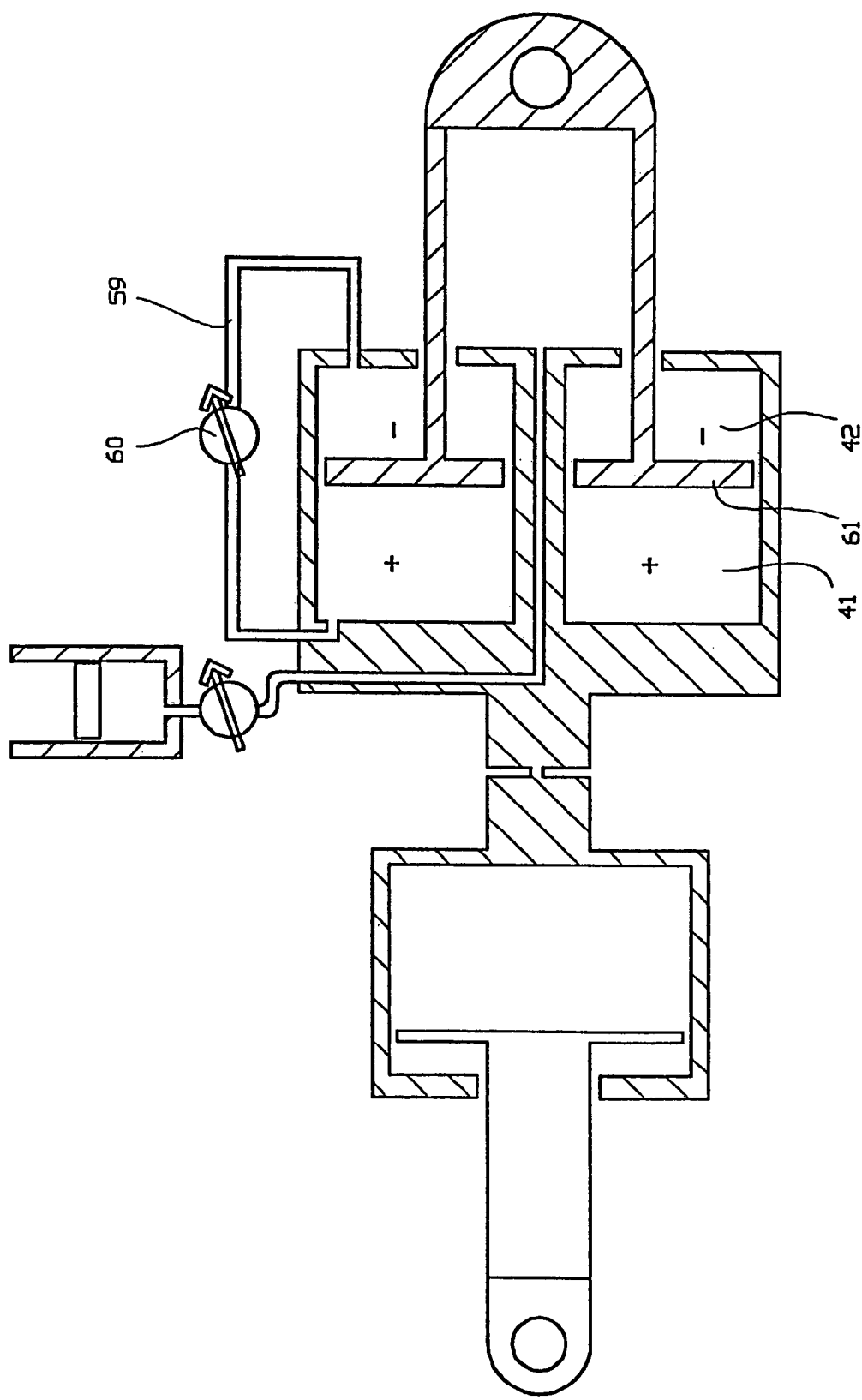
FIG. 4 shows a further embodiment of an adjusting device with a compensation reservoir.

FIG. 4 shows a variant of the embodiment of FIG. 3, where the plus chamber 41 and the minus chamber 42 are connected with one another via an "external" pneumatic line 59 and a check valve 60.

Of course, a "filling line" (not illustrated) may also be provided here for filling the plus chamber 41 or the minus chamber 42, respectively, with a gas or with air.

Figure 5:
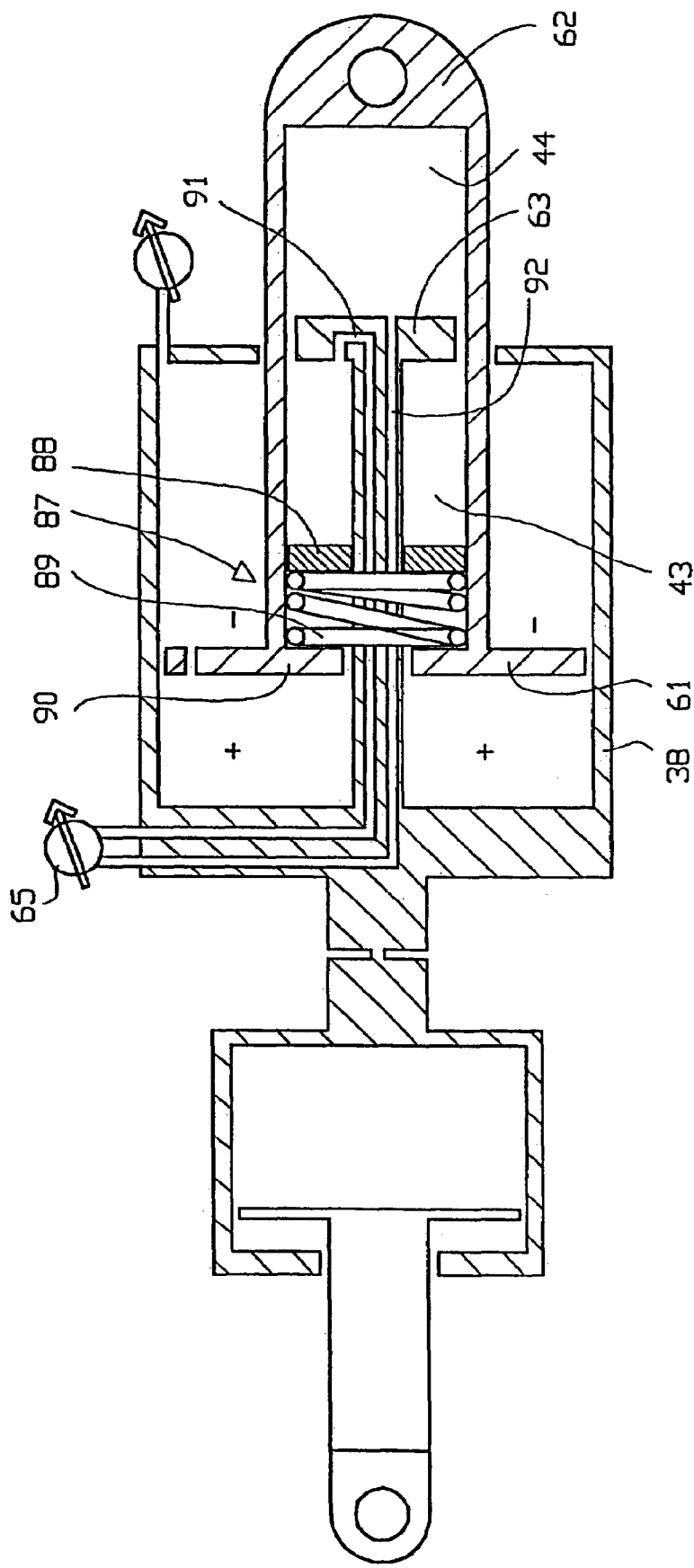
FIG. 5 shows an embodiment of an adjusting device with a mechanical compensation means.

FIG. 5 shows an embodiment in which a compensation means 87 formed by an annular piston 88 and a spring 89, which are shiftable in the piston element 62, is provided for the "volume compensation" between the first hydraulic cylinder chamber 43 and the second hydraulic cylinder chamber 44. The pressure prevailing in the cylinder chamber 43 presses onto the annular piston 88 contrary to the pressure force of the spring 89 which is supported against a wall 90 of the piston element 62. The spring force and the pressure prevailing in the cylinder chamber 43 thus are at equilibrium. The cylinder chamber 43 further is in connection with the check valve 65 via a hydraulic line 91. From the check valve 65, another hydraulic line 92 leads to the cylinder chamber 44. Here, too, the piston-shaped end portion 63 seals the cylinder chamber 43 against the cylinder chamber 44.

When the check valve 65 is open, the piston element 62 thus can be shifted in the cylinder housing 38. Due to the different cross-sectional areas of the cylinder chambers 43, 44, a volume compensation is necessary, which is effected in this case by shifting of the annular piston 88. Alternatively to the mechanical spring 89 as illustrated, a pneumatic spring or another mechanical spring, respectively, may also be provided.

Figure 6:
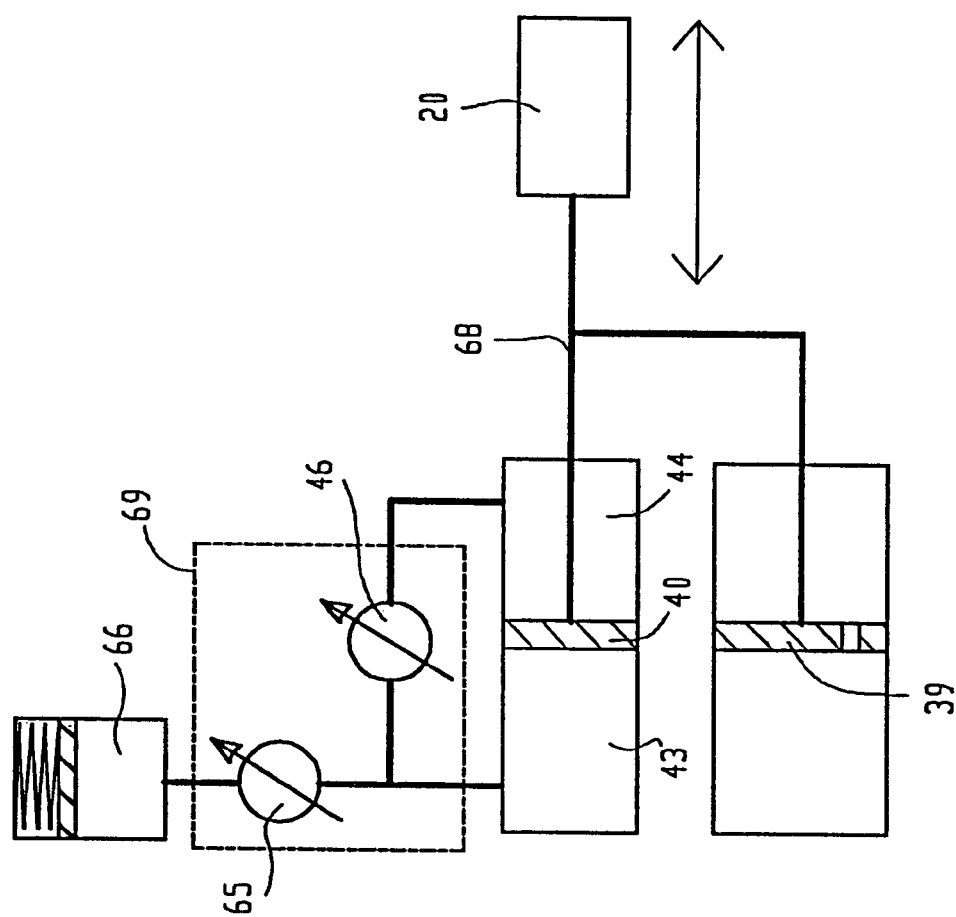
FIG. 6 is a schematic representation of a variant of the invention.

FIG. 6 is a schematic illustration showing that the pneumatic piston 39 and the hydraulic piston 40 may, alternatively to the embodiments described above, also be arranged "in parallel" and may be connected with one another and with the spring element 20 via axially shiftable rods 68. Furthermore, the hydraulic check valve 46, via which the hydraulic cylinder chambers 43, 44 are connectable with each other, and the hydraulic check valve 65, via which the hydraulic cylinder chamber 43 is connectable with the compensation reservoir 66, may be included in one common unit 69, e.g. in a common housing.

In the following Figures, the invention will be explained specifically in connection with a bicycle.

Figure 7:
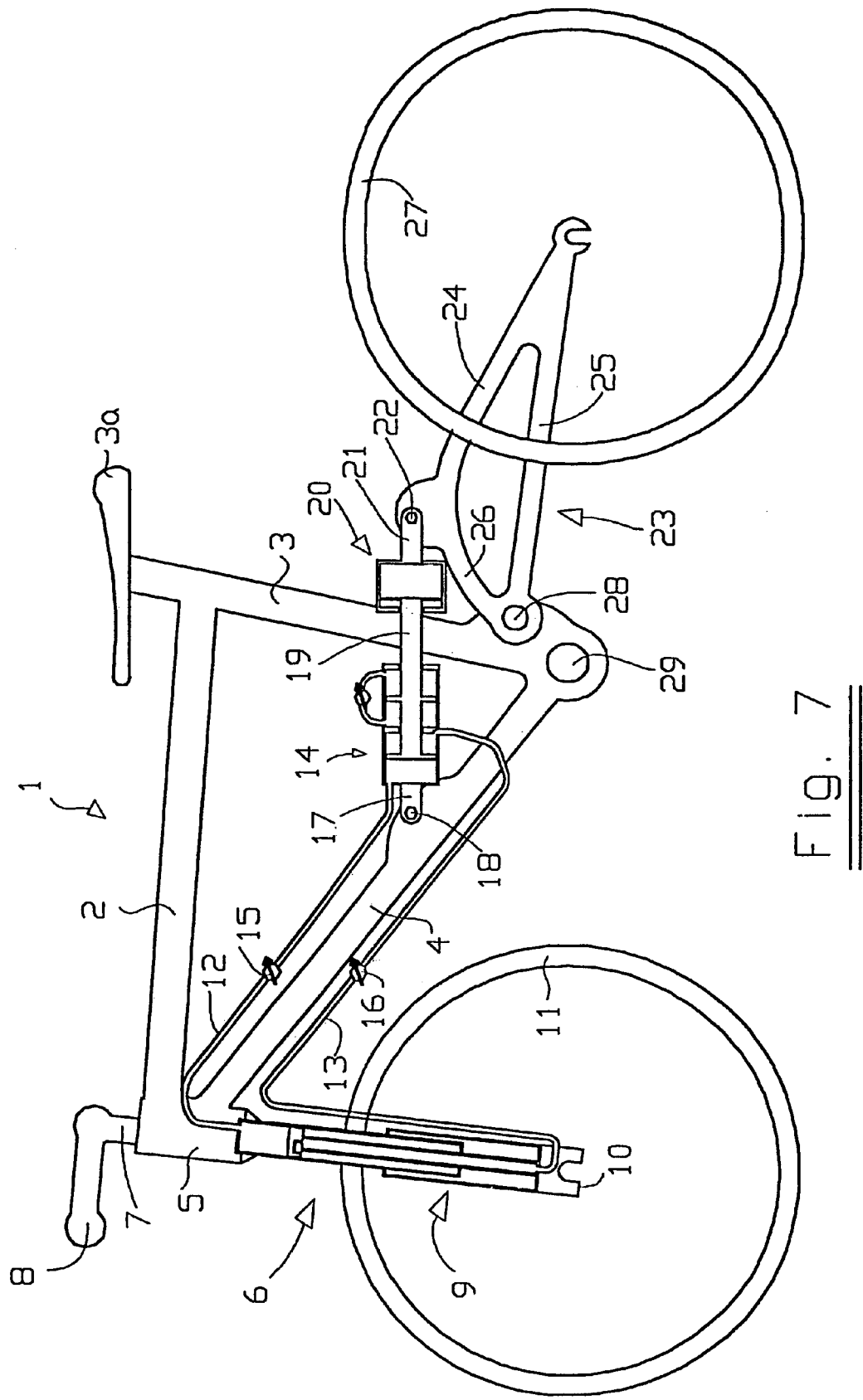
FIG. 7 shows a bicycle in accordance with the invention.

FIG. 7 illustrates a bicycle having a frame 1 that comprises a longitudinal rod 2, a saddle rod 3 and a connecting rod 4. At the common end portion of the longitudinal rod 2 and the connecting rod 4, a steering head bearing 5 is provided, in which one end portion of a front fork 6 or a steering stem 7 that is connected therewith, respectively, is rotatably mounted, on which a handle bar 8 is mounted. The front fork 6 comprises two fork arms, one of which is illustrated only, which is formed by a piston/cylinder assembly 9 that will be explained in detail in connection with FIG. 8. As an alternative to the embodiment illustrated here, a fork having only one fork arm may also be provided. At the free end portion 10 of the piston/cylinder assembly 9, a front wheel 11 is rotatably mounted.

From the piston/cylinder assembly 9, a first pressurizing medium line 12 and a second pressurizing medium line 13 lead to a second piston/cylinder assembly 14, wherein a first check valve 15 is provided in the first pressurizing medium line 12 and a second check valve 16 is provided in the second pressurizing medium line 13.

A housing end portion 17 of the second piston/cylinder assembly 14 is connected with the connecting rod 4 via a lag hinge 18.

A piston rod 19 of the second piston/cylinder assembly 14 is connected with a spring element 20 which will also be explained in detail in connection with FIG. 8. One end portion 21 of the spring element 20 is connected via a lag hinge 22 with a swing arm rear suspension 23 which here consists of three communicating rods 24, 25 and 26, and which is provided for the rotatable mounting of a rear wheel 27. The swing arm rear suspension 23 is connected via a lag hinge 28 with the saddle rod 3, at the free end portion of which a saddle 3a is positioned. The lag hinge 28 here is arranged above a pedal bearing 29. Alternatively, the lag hinge 28 may also be arranged such that its swiveling axis coincides with the rotational axis of the pedal bearing 29.

Figure 8:
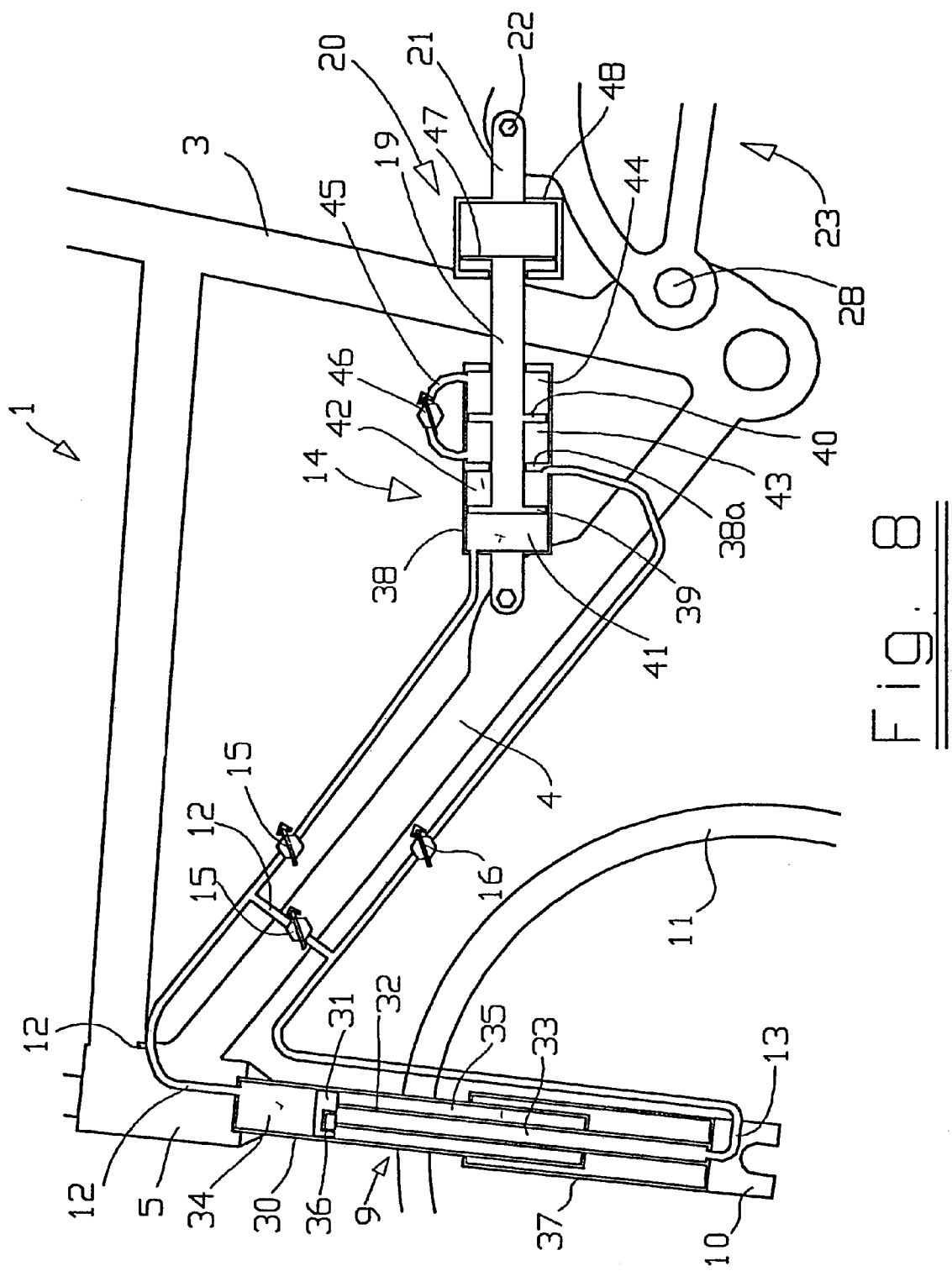
FIG. 8 shows the piston/cylinder assemblies of the embodiment of FIG. 7 in enlarged representation.

FIG. 8 illustrates an enlarged section of the bicycle of FIG. 7.

The piston/cylinder assembly 9 consists of a pneumatic cylinder 30 which incorporates a piston 31. The piston 31 comprises a piston rod 32 with a piston rod interior 33. The piston 31 divides the pneumatic cylinder 30 into a first cylinder chamber 34, which may be referred to as "plus chamber", and a second cylinder chamber 35 that is annular and that is limited by the pneumatic cylinder 30 and the piston rod 32. The piston 31 further comprises a connecting channel 36 that connects the piston rod interior 33 with the second cylinder chamber 35 and may be formed as a nozzle or throttle point so as to effect damping during springing. The piston rod interior 33 and the second cylinder chamber 35 together form a "minus chamber" of the piston/cylinder assembly. The "plus chamber" 34 has a piston area that is larger by the cross-sectional area of the piston rod 32 than that of the "minus chamber" formed by the piston rod interior 33 and the second cylinder chamber 35.

The minus chamber serves as a progressively adjustable counter-spring.

The connecting channel 36 has a relatively small cross-section and acts as "throttle" or "damping element" during springing in or springing out, respectively. The cross-section, however, need not necessarily be small and constitute a throttle point.

The end portion of the piston rod 32 that is opposite the piston 31 is connected with a conducting tube 37 that is provided for conducting the pneumatic cylinder 30. The pneumatic cylinder 30 and the conducting tube 37 thus constitute a telescopic shock-absorbing leg which here is a fork arm of the front fork. At the free end portion 10 of the conducting tube 37 the front wheel 11 is mounted.

The first pressurizing medium line 12 is connected with the first cylinder chamber 34, and the second pressurizing medium line 13 is connected with the piston rod interior 33. The piston rod interior 33 may also be considered as "elongated pressurizing medium line 13". Via the check valves 15, 16, the pressurizing medium lines 12, 13 are connected with the second piston/cylinder assembly 14.

Furthermore, the pressurizing medium lines 12 and 13 can be connected with one another via a bypass line 12 into which a check valve 15' has been incorporated, so as to adjust the same pressure in both pressure circuits. Thus, only one valve 12" that is connected to one of the lines 12, 12' or 13 at any place, is required for building up pressure, i.e. for "pumping up".

The "actuators" or valves 15, 15', respectively, may be arranged such that they can easily be reached by the cyclist even during riding, e.g. in the region of the steering head bearing 5 or the handle bar 8, respectively.

The second piston/cylinder assembly 14 comprises a cylinder housing 38 which incorporates the piston rod 19. The piston rod 19 comprises a pneumatic piston 39 and a hydraulic piston 40. The pneumatic piston 39 divides the cylinder housing 38 into a first pneumatic cylinder chamber 41, which is referred to as "plus chamber", and a second pneumatic cylinder chamber 42, which is referred to as "minus chamber". Here, too, the "plus chamber" 41 has a piston area that is greater by the cross-sectional area of the piston rod 19 than that of the "minus chamber" 42. Since both "plus chambers" 34, 41 have a larger piston area than the allocated minus chambers, a sufficiently strong "pneumatic spring" can be obtained, with the spring strength depending on the pressure in the chambers.

The second pneumatic cylinder chamber 42 is limited by the pneumatic piston 39, the cylinder housing 38, and by a housing wall 38a that comprises a piston opening through which the piston rod 19 is conducted. The first pneumatic cylinder chamber 41 is connected with the first pressurizing medium line 12 and the second pneumatic cylinder chamber 42 is connected with the second pressurizing medium line 13.

The hydraulic piston 40 divides the housing 38 further into a first hydraulic cylinder chamber 43 and a second hydraulic cylinder chamber 44, which are e.g. filled with oil. The two hydraulic cylinder chambers 43, 44 are connected with one another via a hydraulic line 45 that can be shut off by means of a check valve 46.

At the end portion of the piston rod 19 opposite to the pneumatic piston 39 a spring piston 47 is provided which is incorporated in a housing 48 of a spring element 20. The "adjusting device", i.e. the piston/cylinder assembly 14 of the rear wheel 27, thus is completely decoupled from the spring element 20. Such decoupling would also be possible at the front fork. In the interior of the housing 48 a mechanical spring or an elastomer element may, for instance, be arranged. The housing 48 is connected with the swing arm rear suspension 23 via the end portion 21 and the lag hinge 22.

In the following, the functioning will be explained in detail.

When the check valve 46 is closed, the piston rod 19 is locked by the hydraulic fluid in the hydraulic cylinder chambers 43, 44. Via the spring element 20 the swing arm rear suspension 23 is "springily", i.e. pivotable about the lag hinge 28, connected with the frame 1.

The piston rod 32 forms a "pneumatic spring" with the pneumatic cylinder 30 and the gas volume included in the first cylinder chamber 34 and in the first pressurizing medium line 12, wherein the first cylinder chamber 34 is in connection with the first pneumatic cylinder chamber 41 when the check valve 15 is open. During "springing in" of the piston rod 32 the pressure in the first cylinder chamber 34 or in the first pressurizing medium line 12 and in the first pneumatic cylinder chamber 41, respectively, increases. Accordingly, the pressure decreases in the second pressurizing medium line 13, the piston rod interior 33 and the second cylinder chamber 35.

When the check valves 15, 16 and 46 are open, the piston rod 19 can be shifted in the direction of the saddle rod 3, with hydraulic fluid flowing from the hydraulic cylinder chamber 44 via the hydraulic line 45 into the first hydraulic cylinder chamber 43. By shifting the piston rod 19, the swing arm rear suspension 23 rotates clock-wise around the lag hinge 28 whereby the rear wheel is "lowered". With the shifting of the piston rod 19, the pneumatic piston 39 is also shifted, which results in that air flows from the second pneumatic cylinder chamber 42 via the second pressurizing medium line 13 into the piston rod interior 33 or the second cylinder chamber 35, respectively. This causes the piston 31 to be pressed upwards, which results in air flowing over from the first cylinder chamber 34 into the first pneumatic cylinder chamber 41. By the shifting of the piston 31 or the piston rod 32, respectively, the pneumatic cylinder 31 is pushed into the conducting tube 37, whereby the length of the front fork is reduced and the rear wheel is "extended". This fork or rear wheel adjustment is especially suited for riding uphill.

Vice versa, by pressing down the saddle rod 31, the piston rod 19 can be shifted in the direction of the connecting rod 4, whereby the swing arm rear suspension is swiveled counter-clockwise and the length of the front fork is extended.

After adjusting a desired front wheel height or rear wheel height, respectively, the check valves 15, 16, 46 are closed. By "retracting" of the front fork 31 and "extending" of the rear wheel, the sitting position can be adjusted such that the cyclist is seated almost horizontally during uphill riding. Accordingly, a "downhill riding position" can be adjusted by extending the front fork and retracting the rear wheel.

As an alternative to the illustrated "locking device" formed by the hydraulic cylinder chambers 43, 44 and the check valve 46, a "mechanical fixing device" for fixing the piston 19 may also be provided. Furthermore, the cylinder chambers 34, 35, 41 and 42 as well as the pressurizing medium lines 12, 13 may also be filled with a hydraulic fluid. Due to the incompressibility of the hydraulic fluid, the piston/cylinder assembly 9 then is, however, rigid when the check valves 15, 16 are closed. In this variant, a mechanical suspension that is "decoupled" from the piston/cylinder assembly 9 may, however, be provided, for instance by a spring element that springily connects the front fork with the steering head bearing 5.

The two check valves 15 and 16 and the check valve 15' in the bypass line 12' may further be designed and arranged such that they can be actuated by a common actuator (not illustrated). Furthermore, the pressurizing medium lines 12, 13 can be incorporated in the interior of the frame 1, i.e. in the interior of the connecting rod 4.

In the embodiment shown in FIG. 8, the pneumatic cylinder chambers 34, 35 of the piston/cylinder assembly 9 at the front fork and the pneumatic cylinder chambers 41, 42 can be connectable with one another via a respective pressurizing medium line in which a shut-off device is arranged. By means of the shut-off device, a separate, i.e. independent, adjustment of the piston/cylinder assembly 9 and of the piston/cylinder assembly 14 is possible. By means of the shut-off device, the cylinders may be maintained on different levels. This variant is of particular advantage when only one adjustable fork or only one adjustable rear assembly damper is provided.

As an alternative to the embodiment of FIG. 8, the locking device may also comprise a single-acting cylinder. This single-acting cylinder may e.g. be integrated in a common cylinder housing of the piston/cylinder assembly 14 of the rear wheel suspension. The single-acting cylinder may furthermore be connected with a compensation reservoir via a pressurizing medium line in which a shut-off device is provided. By means of the shut-off device, the single-acting cylinder may be separated from the compensation reservoir. The locking device thus can also be put into practice by means of a single-acting cylinder, a compensation reservoir and a shut-off device.

Furthermore, the pressurizing medium lines 12, 13 can be connected with one another via a further pressurizing medium line and a further shut-off device. This makes it possible to open the entire system, which enables a simple adjustment of the individual chambers of the piston/cylinder assemblies.

Figure 9:
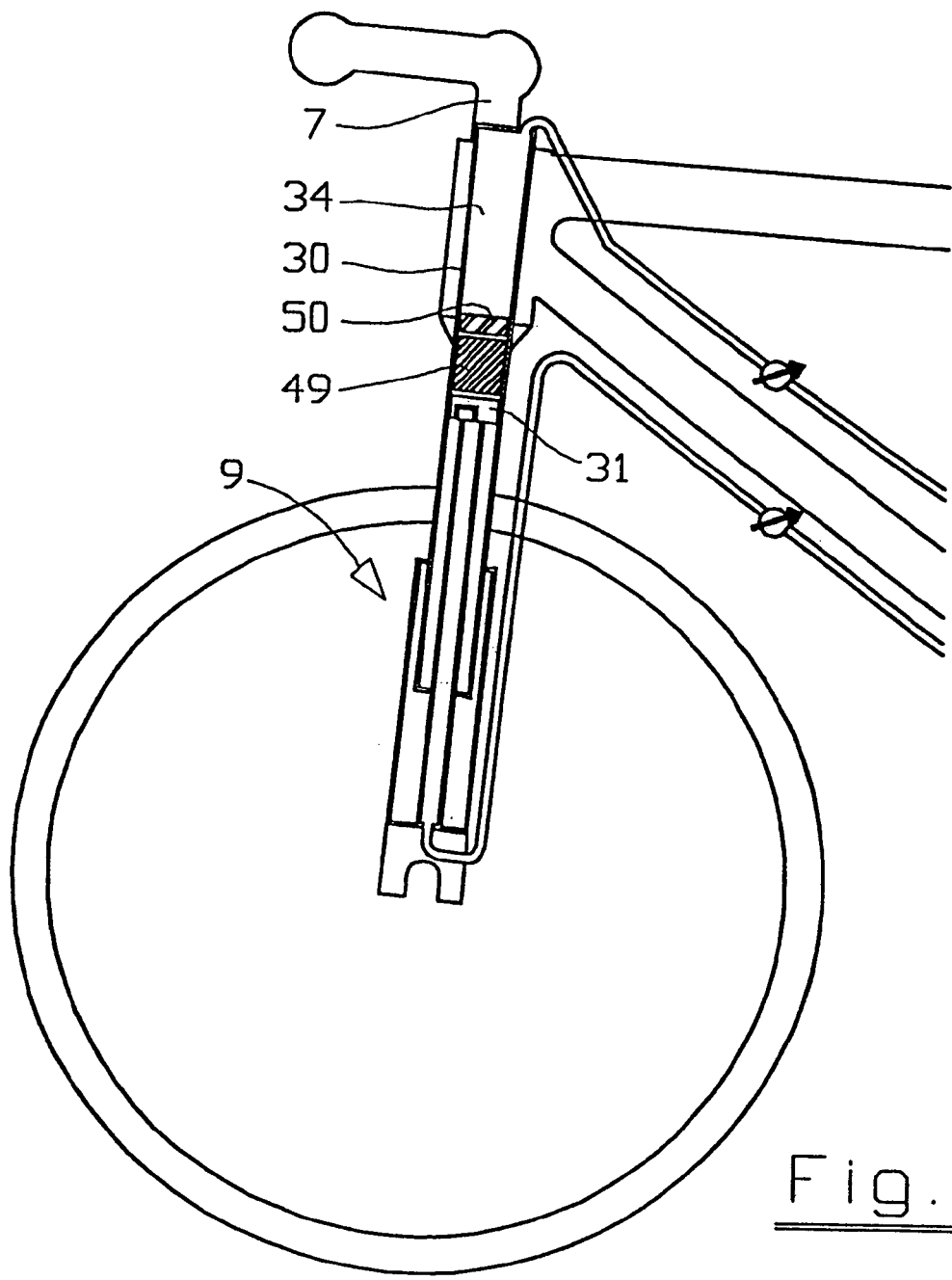
FIG. 9 shows a further embodiment in accordance with the invention.

FIG. 9 shows a variant of the embodiment of FIGS. 7 and 8.

In the embodiment of FIG. 9, the pneumatic cylinder 30 is longer than with the embodiment of FIGS. 6 and 7, this resulting in a longer range of spring. In the pneumatic cylinder 30, an element 49 of resilient material and, further, a "floater element" 50 are arranged above the pneumatic piston 31; the "floater element" 50 seals the first cylinder chamber 34 against the cylinder chamber in which the resilient element 49 is arranged. Furthermore, clampings may be provided that would clamp the piston, with the "length" being extendable downwards.

The resilient element 49 improves the springing properties and serves as suspension in the so-called "uphill position", i.e. during uphill riding. During uphill riding, the piston/cylinder assembly 9 is retracted, i.e. the first cylinder chamber 34 has a smaller volume than in FIG. 9 or the volume zero, respectively, with the floater element then abutting at the handle bar-side end portion of the pneumatic cylinder 30. In this position, the "range of pneumatic spring" is relatively small or zero, respectively. By means of the resilient element 49, a certain "residual suspension" may be maintained, though.

The "additional elastomer chamber" thus primarily serves as emergency suspension, in particular for the case that the piston/cylinder assembly 9 leaks and air escapes. The cyclist thus will always arrive safely at home even in the case of a defect. This "elastomer chamber" always springs synchronously to the plus chamber 34. In the uphill position, the plus chamber 34 is "almost" zero. Thus, the plus chambers of fork and rear assembly and the minus chambers are only almost identical. Tests have shown that some air still remains in the fork, i.e. in the piston/cylinder assembly 9, even when the rear assembly has been completely extended.

Alternatively or in supplement to the resilient element 49, a mechanical spring element, such as a coil spring or a pre-filled compressed-air cylinder which simply is inserted, may also be used. The coil spring may, in accordance with FIG. 9, be positioned between the piston 31 and the floater element 50, or between the floater element 50 and the handle bar-side end portion of the pneumatic cylinder 30.

Alternatively to the resilient element 49, an additional pneumatic spring element may also be provided.

Figure 10:
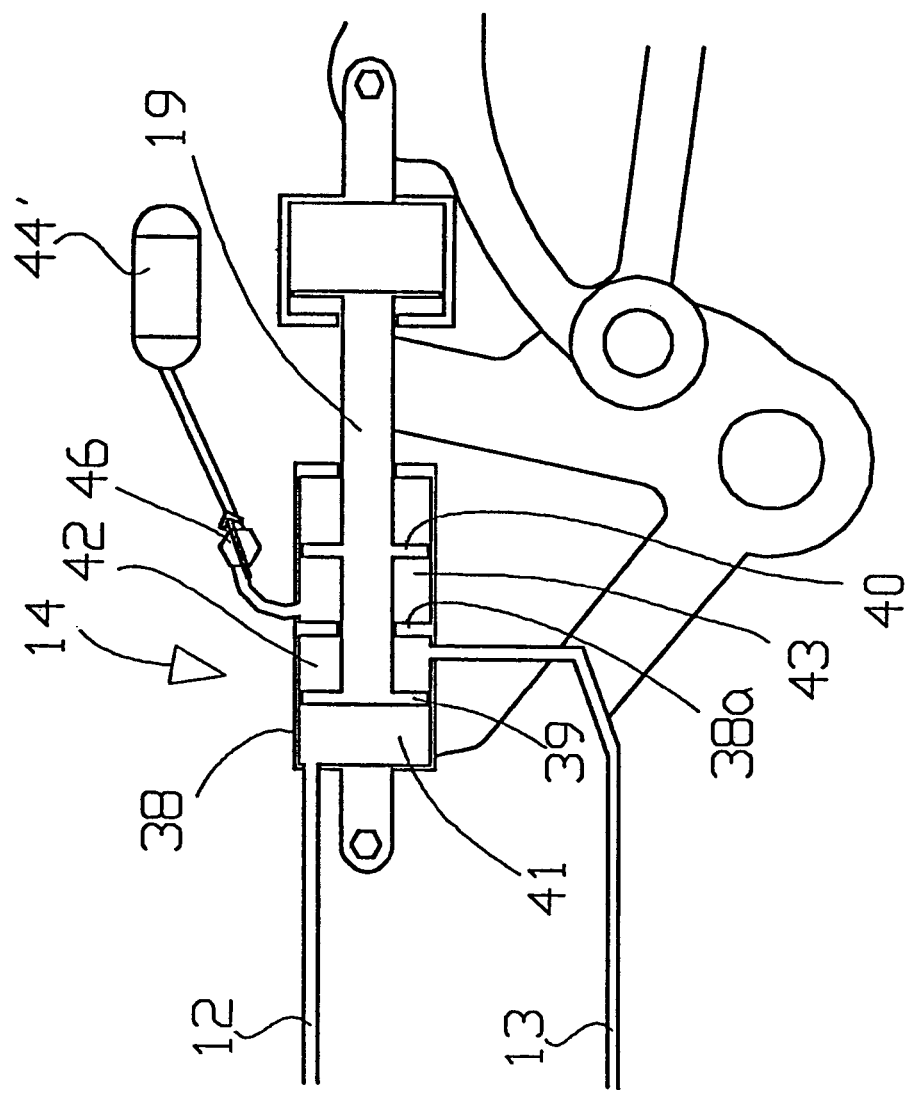
FIG. 10 shows a modification of the locking device.

FIG. 10 shows a modification of the locking device, wherein only the cylinder chamber 43 is, via the check valve 46, connected with a hydraulic reservoir 44' that serves as compensation reservoir when the piston rod 19 is shifted. When the check valve 46 is closed, the piston rod 19 is definitely fixed due to the incompressibility of the hydraulic fluid in this device, too.

Alternatively to the piston/cylinder assembly 14 described in FIG. 6, 7 or 9, other ones of the abovementioned embodiments may also be used.

It is in particular also possible to provide an adjusting device exclusively at the front wheel suspension or at the rear wheel suspension, respectively, or to provide completely separate adjusting devices for the front wheel suspension and the rear wheel suspension, which are neither pneumatically nor hydraulically coupled with one another.

Figure 11:
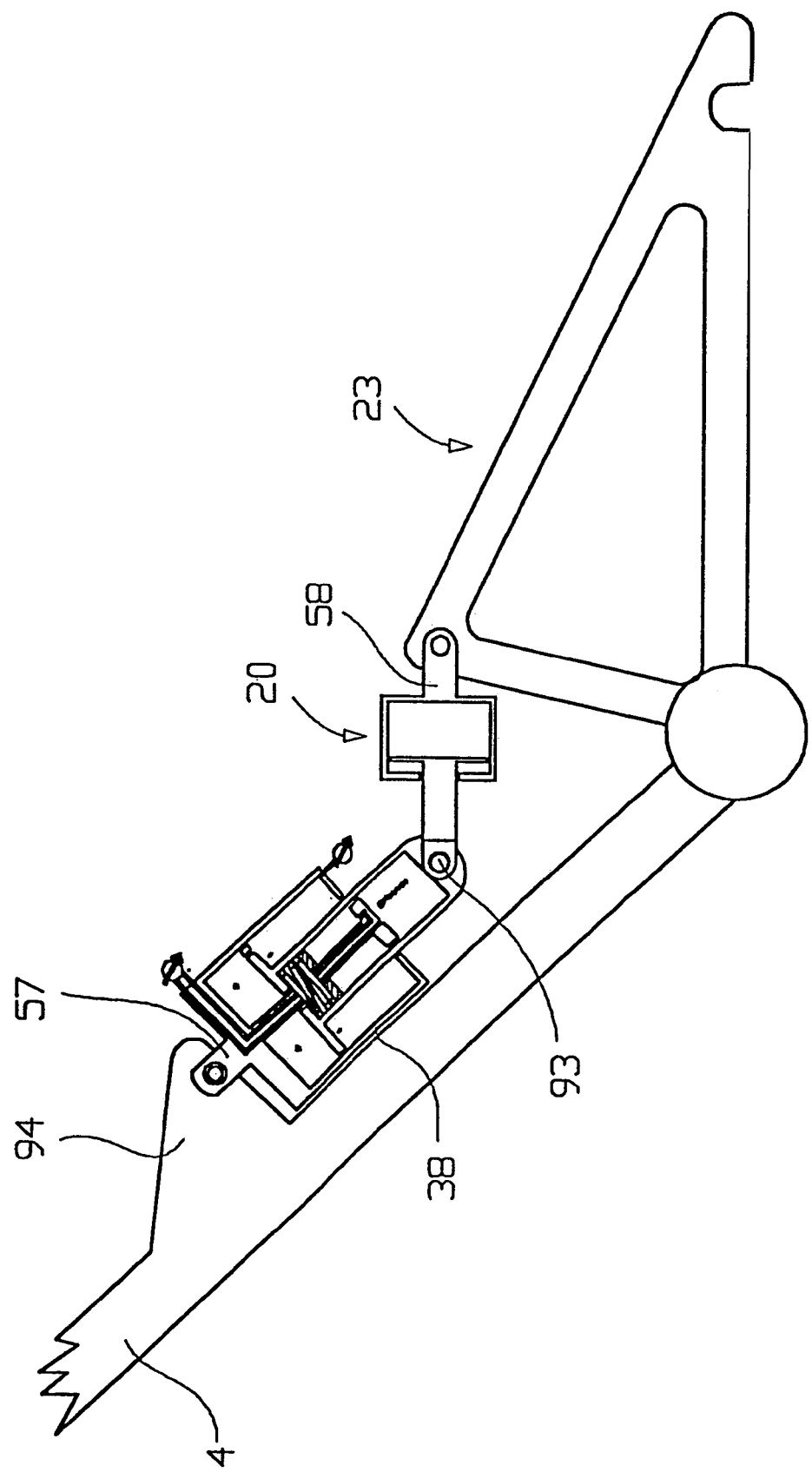
FIGS. 11–15 show further embodiments in accordance with the invention.

FIG. 11 shows a variant of the embodiment of FIG. 5, with the cylinder housing 38 and the spring element 20 being flexibly connected via a lag hinge 93. The cylinder housing 38 is mounted via the hinged bracket 57 on a supporting element 94 of the connecting rod 4, and the hinged bracket 58 of the spring element 20 is flexibly mounted on the swing arm rear suspension 23. By means of such a "non-linear arrangement" of adjusting unit and spring element, the "angle of attack" of the spring element 20 may, moreover, be,changed progressively or decreasingly, respectively.

The adjusting unit, i.e. the cylinder housing 38, may additionally be conducted along the connecting rod 4, e.g. by a bar or the like.

Figure 12:
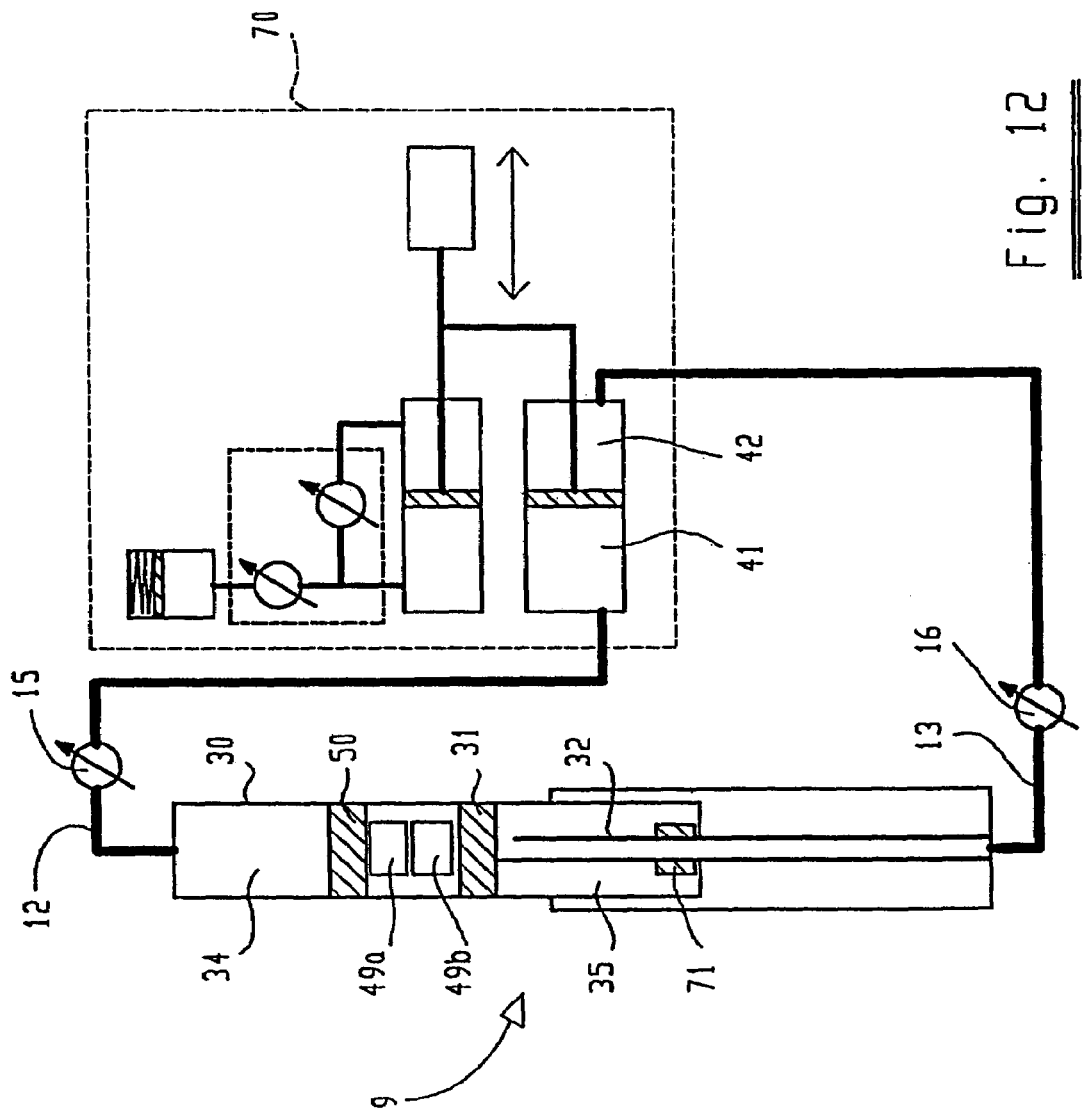

FIG. 12 shows a schematic embodiment with two adjusting devices, namely a piston/cylinder assembly 9, and a further adjusting device 70 that corresponds substantially to that of the embodiment of FIG. 6. The piston/cylinder assembly 9 may, for instance, be provided for adjusting the front wheel suspension, and the adjusting device 70 for adjusting the rear wheel suspension (cf. FIG. 7). The first cylinder chamber 34, i.e. the plus chamber of the piston/cylinder assembly 9, is connected with the plus chamber 41 of the adjusting device 70 via the first pressurizing medium line 12 and the shut-off device 15. Furthermore, the second cylinder chamber 35, i.e. the minus chamber of the piston/cylinder assembly 9, is connected with the minus chamber 42 of the adjusting device 70 via the pressurizing medium line 13 and the shut-off device 16.

In the embodiment of FIG. 12, two resilient elements 49a, 49b are arranged between the pneumatic piston 31 and the floater element 50, in contrast to FIG. 9. The resilient elements 49a, 49b improve the suspension properties and serve as suspension in the so-called "uphill position", i.e. during uphill riding. During uphill riding, the piston/cylinder assembly 9 is retracted, i.e. the first cylinder chamber 34 has a relatively small volume, or the volume zero, respectively, with the floater element then abutting at the handle bar-side or upper end portion of the pneumatic cylinder 30. In this position, the "range of pneumatic spring" is relatively small or zero, respectively. The resilient elements 49a, 49b then ensure a certain "residual spring effect". The resilient elements 49a, 49b in particular may be manufactured of different materials, i.e. they may have different spring strengths.

An annular resilient element 71 is arranged at the piston rod 32 and serves as return element in the so-called "downhill position" in which the piston/cylinder assembly 9 is extended. The resilient element 71 prevents the piston 31 from hitting against the lower end portion of the pneumatic cylinder during springing out.

Figure 13:
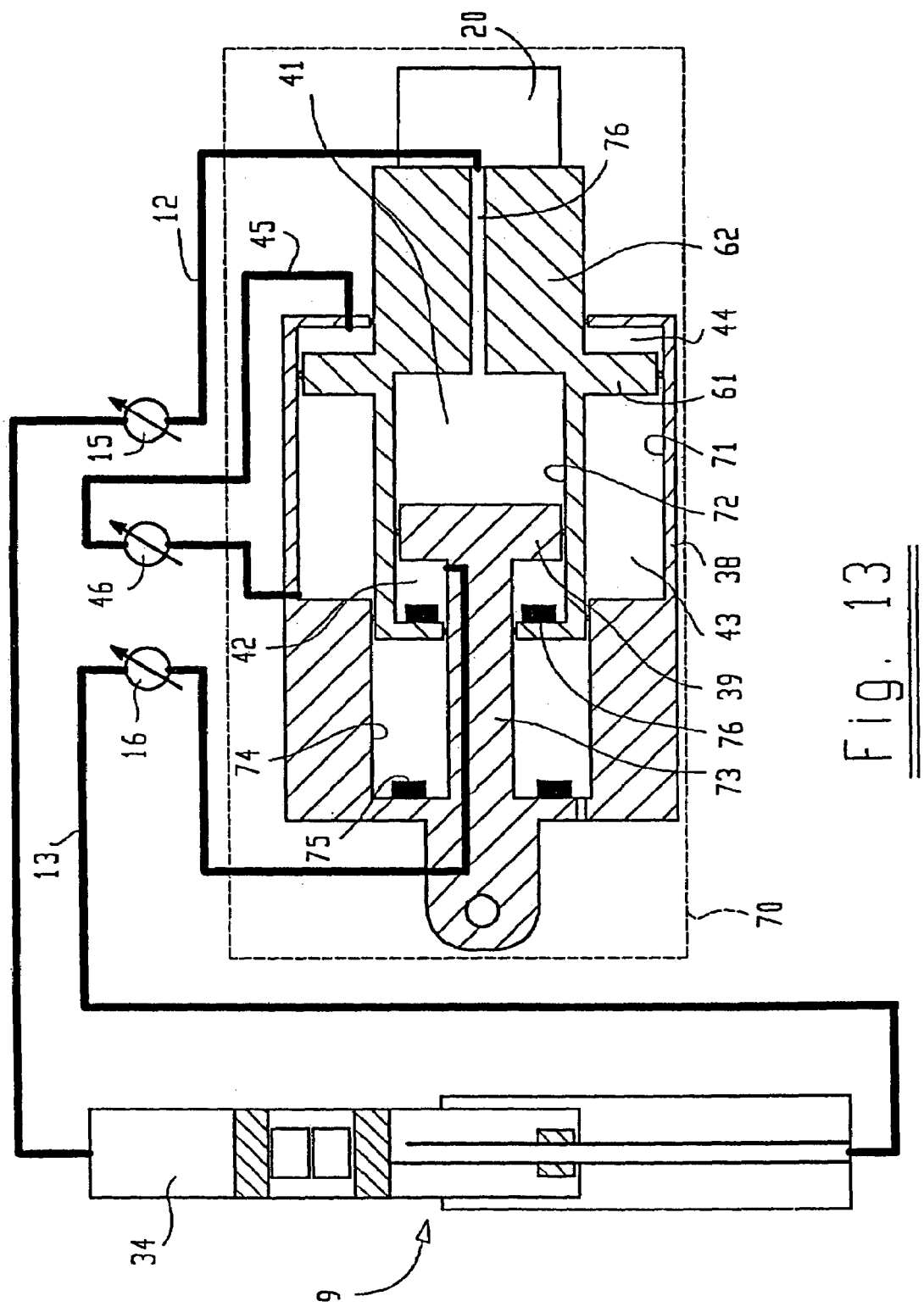

FIG. 13 shows a further embodiment with two adjusting devices that are coupled with one another. The first adjusting device is formed by the piston/cylinder assembly 9 and concurs with that of the embodiment of FIG. 12. The second adjusting device 70 comprises a cylinder housing 38 in which the piston element 62 is shiftably incorporated. The piston 61 of the piston element 62 slides in a recess 71 of the cylinder housing 38 and divides the recess 71 into the first hydraulic cylinder chamber 43 and the second hydraulic cylinder chamber 44, which can be connected with one another via the hydraulic line 45 or the check valve 46, respectively.

The piston element 62 further comprises an inner recess 72 in which the pneumatic piston 39 slides. The pneumatic piston 39 here is an integral component of the cylinder housing 38 and divides the recess 72 into the first pneumatic cylinder chamber 41 or "plus chamber" and the second pneumatic cylinder chamber 42 or "minus chamber".

The piston element 62 is further slidably conducted at a piston rod-like element 73 and at a further cylindershaped recess 74 of the cylinder housing 38. At each axial end portion of the recesses 72 and 74, resilient elements 75 or 76, respectively, are arranged, which prevent the piston element 62 from hitting against the cylinder housing 38.

The plus chamber 41 is connected with the first cylinder chamber 34, i.e. with the plus chamber of the piston/cylinder assembly 9, via a pneumatic line 75 and a resilient pneumatic pressurizing medium line 12 as well as the check valve 15. The second pneumatic cylinder chamber 42, i.e. the minus chamber, is connected with the minus chamber of the piston/cylinder assembly 9 via the pressurizing medium line 13 and the check valve 16. At one end portion of the adjusting device 70, a spring element 20 or a damping element, respectively, is provided like with the embodiments of FIGS. 1 to 7 and 9.

In this embodiment, too, the piston area allocated to the plus chamber 41 is larger than the piston area allocated to the minus chamber 42. Consequently, here, too, an axial force results that automatically extends the piston element 62 when the check valve 46 is open and when the "plus circuit" is connected via the line 12 with the "minus circuit" via the line 13. A hydraulic compensation reservoir is not necessary in this embodiment since the annular areas of the hydraulic cylinder chambers 43, 44 have the same annular cross-sections, i.e. the volume flowing off the one hydraulic cylinder chamber flows into the other hydraulic cylinder chamber and vice versa.

Figure 14:
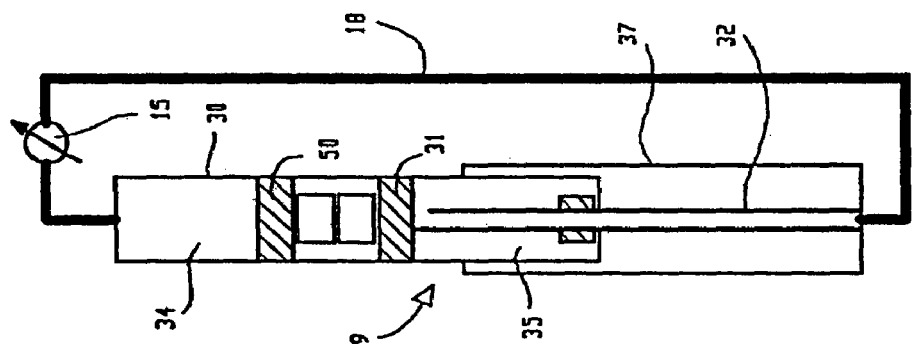

FIG. 14 shows an embodiment of the piston/cylinder assembly 9 in which the plus chamber 34 can be directly connected with one another via the pressurizing medium line 12 and the check valve 15. When the check valve 15 is opened, a pressure compensation occurs between the plus chamber 34 and the minus chamber 35. Unless any external axial forces are exerted on the piston/cylinder assembly 9, the pneumatic cylinder 30 is "automatically" pressed out of the conducting tube 37. Here, too, the cross-sectional area of the floater element 50, which is impacted by the pressure prevailing in the plus chamber 34, is larger than the cross-sectional area of the piston 31, which is impacted by the pressure of the minus chamber 35, with the difference in the cross-sectional areas corresponding to the cross-sectional area of the piston rod 32. Since the same pressure prevails in the plus chamber 34 and the minus chamber 35 after the check valve 15 has been opened, a difference force results which effects the extending of the piston/cylinder assembly 9.

Figure 15:
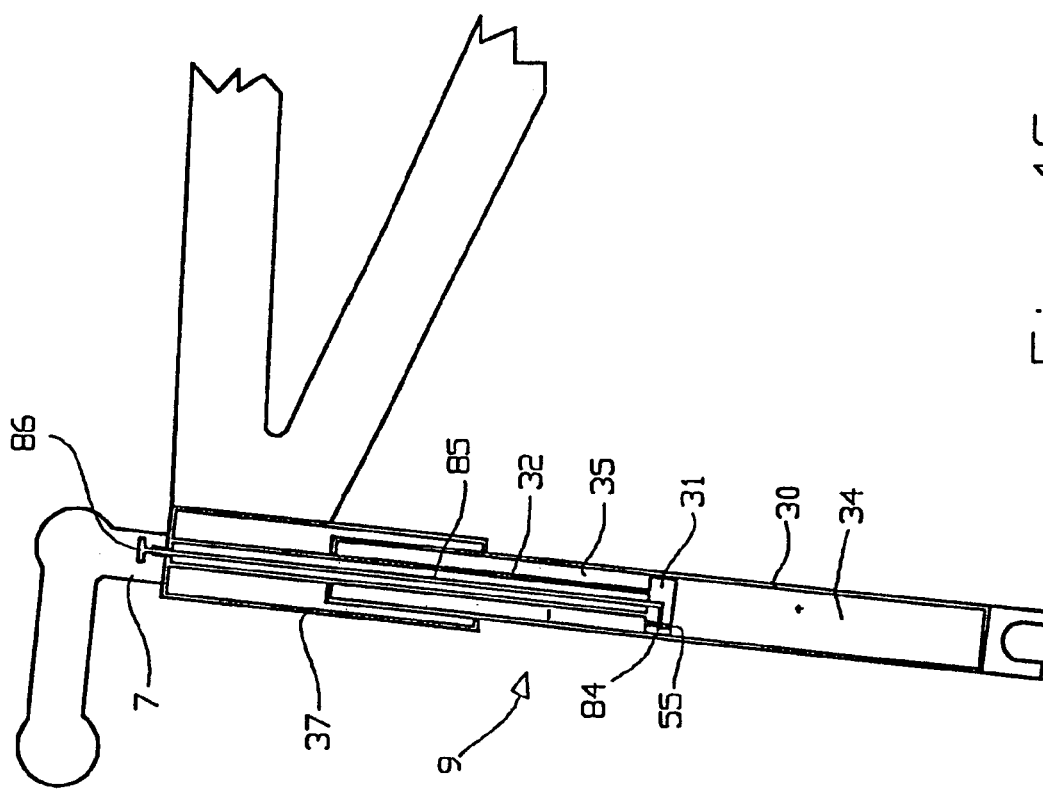

FIG. 15 shows a variant of the embodiment of FIG. 8. The conducting tube 37 or the piston rod 32 connected therewith, respectively, here are positioned "at the top", i.e. toward the steering stem. At the "lower" free end portion of the piston rod 32 the piston 31 is positioned, which is slidably incorporated in the pneumatic cylinder 30. The pneumatic cylinder 30 is inserted longitudinally shiftably in the conducting tube 37.

The first cylinder chamber 34, i.e. the "plus chamber", is formed by the pneumatic cylinder 34 and the piston 31. The second cylinder chamber 35, i.e. the "minus chamber", is an annular cylinder chamber that is formed by the pneumatic cylinder 30, the piston rod 32 and the piston 31. In the piston 31, a passage opening 55 is provided which connects the plus chamber 34 and the minus chamber 35 and which can be opened or closed, respectively, by means of a valve 84. The valve 84 comprises an actuating device 85 that is conducted upwards through the piston 31 or the piston rod 32, respectively, up to the height of the steering stem 7. At the height of the steering stem 7, an actuator 86 is provided which here has the shape of a switch or a draw-button, respectively. The actuating device 85 may, for instance, be a Bowden wire. The valve 84 may, of course, also be actuated differently, for instance electrically, hydraulically, pneumatically etc.

In the case of this embodiment, a height adjustment of the front fork thus can in a particularly comfortable way be carried out from the handle bar or steering stem 7, respectively. Of course, additional spring elements may be incorporated in the plus chamber 34 here, too.

Figure 16:
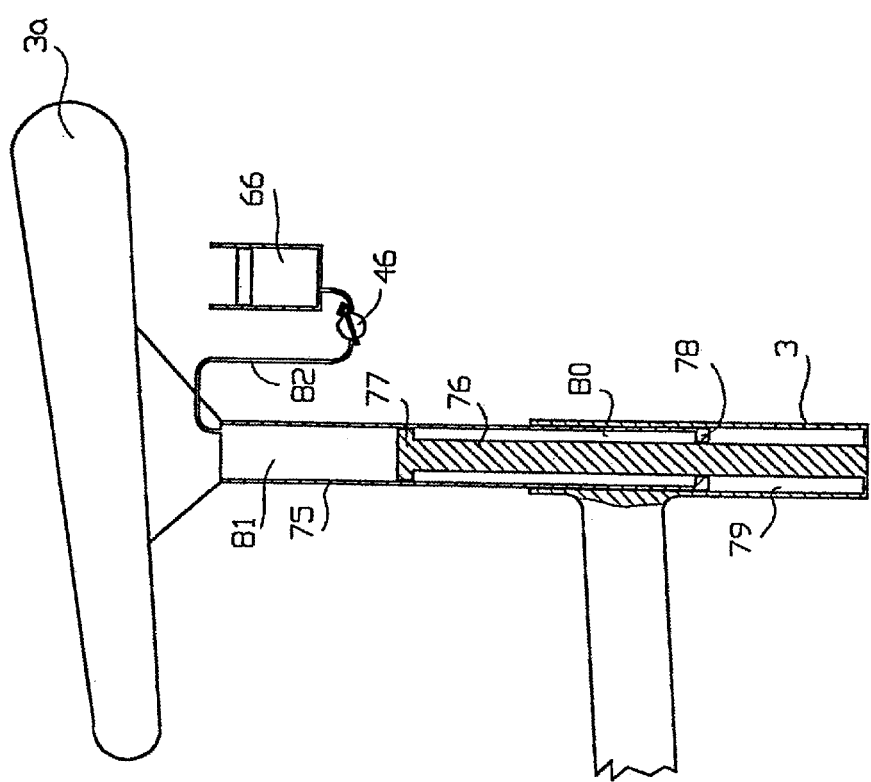
FIG. 16 shows an adjusting device for the height adjustment of a saddle.

FIG. 16 shows an embodiment in which the adjusting device is used for the height adjustment of the saddle 3a. The saddle 3a comprises a saddle tube 75 that is inserted into the saddle rod 3 of the bicycle frame. Furthermore, a piston rod 76 is provided, which is connected with the saddle rod 3 and projects upwardly therefrom. At the upper free end portion of the piston rod 76, a piston 77 is provided which slides in the saddle tube 75. Furthermore, at the lower free end portion of the saddle tube 75, a piston 78 is provided which has a recess through which the piston rod 76 extends. The saddle rod 3, the piston rod 76 and the piston 78 form a plus chamber 79 that can be filled with a gas or with air, respectively, through a filling device (not illustrated). The pistons 77, 78, the piston rod 76 and the saddle tube 75 form an annular minus chamber 80. Corresponding to the embodiment of FIG. 1, the plus chamber 79 and the minus chamber 80 may be in pressure connection via a passage opening (not illustrated) in the piston 78. If a pressure prevails in the plus chamber 79 which is higher than atmospheric pressure, an axial force results that acts in the direction of the saddle 3a. Furthermore, a hydraulic cylinder chamber 81 is provided which is limited by the saddle 3a, the saddle tube 75 and the piston 77. The hydraulic cylinder chamber 81 is in pressure connection with a compensation reservoir 66 via a hydraulic line 82 and via a shut valve 46. When the check valve 46 is opened, the saddle tube 75 is pushed upwards, whereby the volume of the hydraulic cylinder chamber 81 is increased and hydraulic fluid flows in from the compensation reservoir 66. By closing the shut-off device 46, the current height of the saddle is "locked".

Furthermore, a "twisting security" may be provided for the saddle rod. The saddle tube and the saddle rod may, for instance, have an oval cross-section, an externally arranged conducting rod may be provided, a conducting groove, an edge profile etc.

Figure 17:
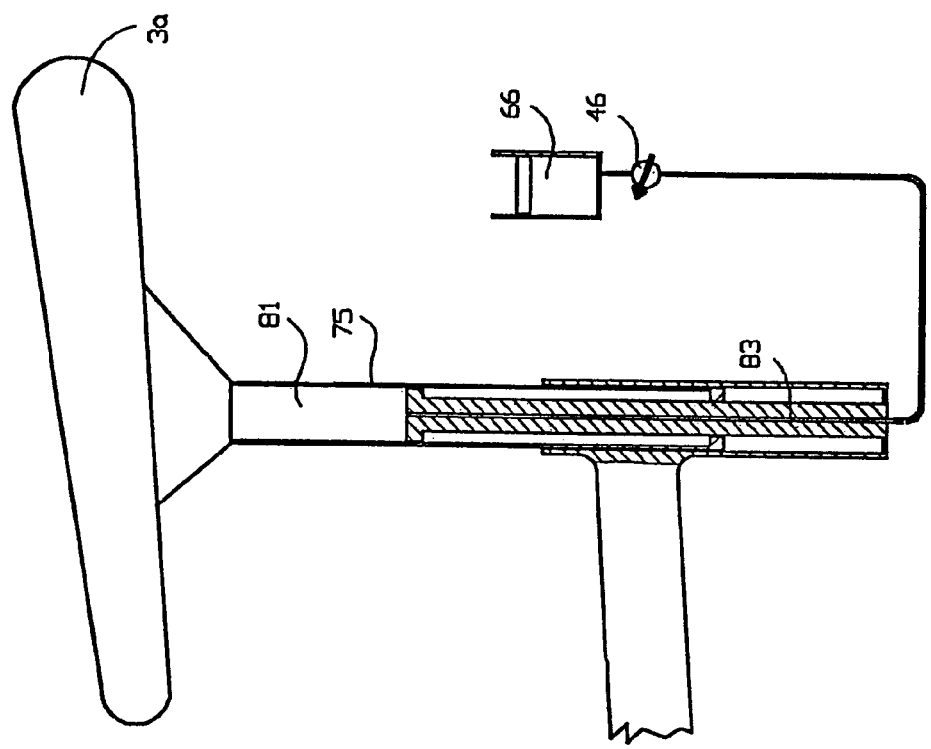
FIG. 17 shows a further adjusting device for the height adjustment of a saddle.

FIG. 17 shows a variant of the embodiment of FIG. 16. Here, the hydraulic cylinder chamber 81 provided in the saddle tube 75 is in connection with the compensation reservoir 66 via a hydraulic line 83 provided in the piston rod 76 and via the check valve 46. The functioning on the opening of the check valve 46 corresponds to that of the embodiment of FIG. 16.

Figure 18:
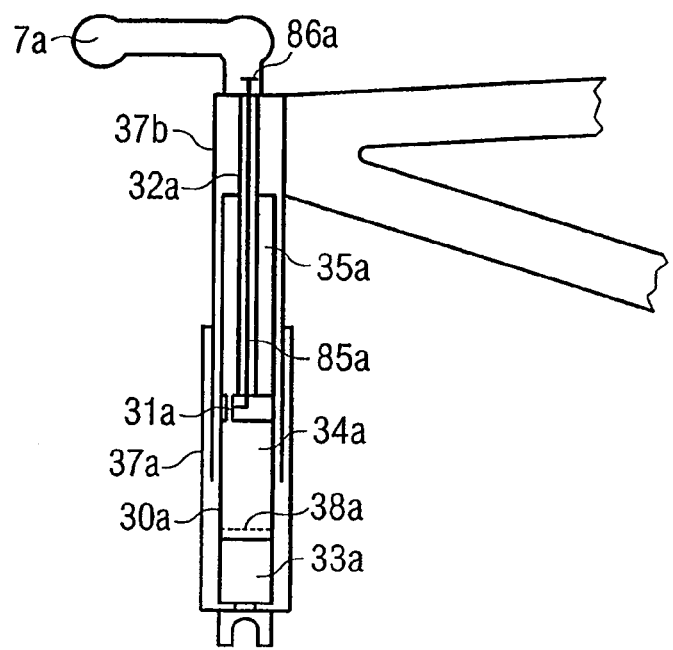

FIG. 18 illustrates an adjusting device for the height adjustment of the front wheel suspension of a bicycle in accordance with a further embodiment of the present invention. A pneumatic cylinder 30a is at its lower end portion mounted via a screw connection (or alternatively e.g. via a plug connection) on a conducting tube 37a. A tube 37b and a piston rod 32a connected therewith is mounted on the steering stem 7a. At the lower end portion of the piston rod 32a, a piston 31a is arranged, which is slidably conducted in the pneumatic cylinder 30a. The tube 37b and the piston rod 32a are shiftable in longitudinal direction vis-à-vis the conducting tube 37a and the pneumatic cylinder 30a.

The first cylinder chamber 34a, i.e. the "plus chamber", is formed by the pneumatic cylinder 30a. The second cylinder chamber 35a, i.e. the "minus chamber", is an annular cylinder chamber that is formed by the pneumatic cylinder 30a, the piston rod 32a and the piston 31a. In the piston, a passage opening is provided which connects the first cylinder chamber 34a with the second cylinder chamber 35a, and which can be opened or closed by a valve. The valve is connected with an actuating device 85a that is conducted upwards through the piston 31a or the piston rod 32a, respectively, up to the height of the steering stem 7a. The actuating device 85a comprises an actuator 86a at the height of the steering stem. When this is operated, the valve opens or closes, respectively.

At the lower end portion of the pneumatic cylinder 30a, an element 33a of a resilient material is positioned. A floater element 38a that seals the first cylinder chamber 34a against the cylinder chamber in which the resilient element 33a is arranged, is positioned thereabove. The floater element may alternatively be designed e.g. airpermeably. Embodiments without a floater element are also conceivable.

In an alternative embodiment that is not illustrated, two additional pressurizing medium lines are provided in an adjusting device corresponding to that illustrated in FIG. 18, which are conducted downwards from the height of the steering stem 7a through the piston rod 32a to the piston 31a. The first pressurizing medium line is in connection with the plus chamber 34a, and the second pressurizing medium line is in connection with the minus chamber 35a. From the adjusting device illustrated in FIG. 18, the pressurizing medium lines lead to a second piston/cylinder assembly which may, for instance, be designed in accordance with the second piston/cylinder assembly 14 as illustrated in FIGS. 7 and 8. The first pressurizing medium line is connected with the plus chamber 41, and the second pressurizing medium line with the minus chamber 42 of the second piston/cylinder assembly 14.

Figure 19:
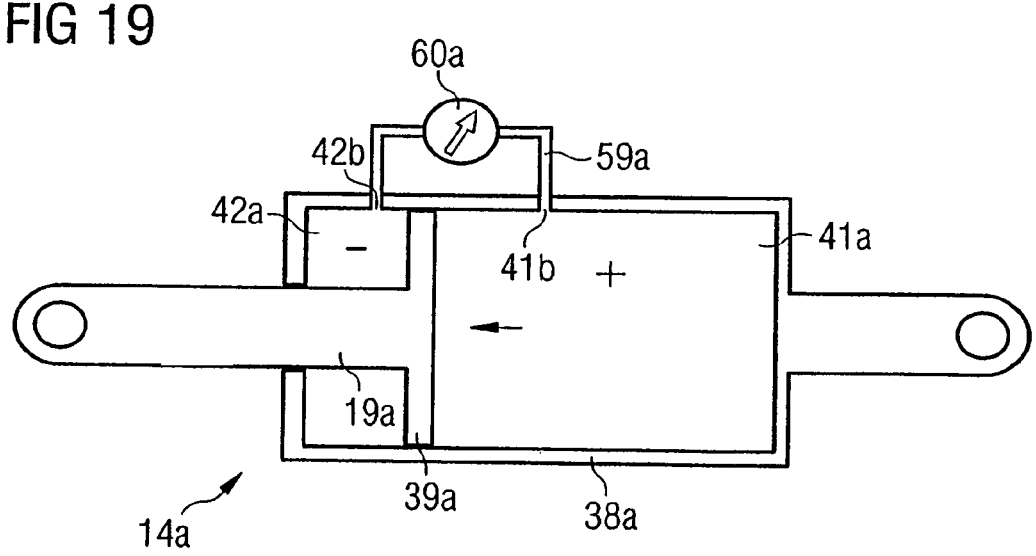

FIG. 19 illustrates an adjusting device formed by a piston cylinder arrangement 14a in accordance with a further embodiment of the invention, which is especially suited for the height adjustment of the rear wheel suspension. The piston cylinder arrangement 14a comprises a cylinder housing 38a in which a piston rod 19a with a pneumatic piston 39a is conducted. The pneumatic piston 39a divides the cylinder housing 38a into a plus chamber 41a and a minus chamber 42a. The plus chamber 41a is connected via a first opening 41b, and the minus chamber 42a via a second opening 42b, with an "external" pneumatic line 59a that can be opened and closed by a check valve 60a. The openings 41b, 42b are provided in the middle wall of the cylinder housing 38a at a certain minimum distance from the right and left cylinder end portions, e.g. more than 2 or 4 cm, respectively.

When the check valve 60a is closed, an equilibrium of forces occurs at the pneumatic piston 19a, with the pneumatic piston 19a assuming the first neutral position illustrated in FIG. 19. For adjusting the adjusting device, the check valve 60a is opened. Consequently, the plus chamber 41a and the minus chamber 42a are connected with one another, so that a pressure compensation between the chambers may take place. The pneumatic piston 19a moves to the left. When it covers the second opening 42b, the plus chamber 41a and the minus chamber 42a are separated again. An equilibrium of forces again occurs at the pneumatic piston 19a, with the pneumatic piston 19a assuming a second neutral position. In this position, it is spaced apart from the left side wall of the cylinder housing 38a. The path of movement thus is limited towards the left; a minimum range of spring remains—even when the check valve 60a is open. Then, the check valve 60a is closed.

For a new adjustment of the adjusting device, the check valve 60a is opened again, and the pneumatic piston 19a is pressed to the right. In the course of the movement to the right, air flows from the plus chamber 41a into the minus chamber 42a. When the pneumatic piston 19a covers the first opening 41b, the plus chamber 41a and the minus chamber 42a are separated again. The piston 19a then can no longer (or only with great effort) be pushed further to the right—the path of movement thus is also limited towards the right. When the check valve 60a is closed, an equilibrium of forces again occurs at the piston 19a, with the piston 19a assuming a third neutral position.

What is claimed is:

1. A bicycle comprising:
a frame;
an adjusting device adjusting a height of a front wheel suspension;
wherein said adjusting device comprises a double-acting piston/cylinder assembly with a first cylinder chamber and a second cylinder chamber separated by a piston that is connected to a piston rod, said two cylinder chambers being filled with compressible gas, and said two cylinder chambers being connectable with one another via a fluid channel, and said piston rod mounted on a steering stem;
a shut-off device positioned in said fluid channel; and
wherein said shut-off device is actuatable via an actuator that is spaced apart from said shut-off device.

2. The bicycle of claim 1 wherein said actuator is arranged in a region of a handle bar.

3. The bicycle of claim 1 wherein said compressible gas comprises air.

4. A bicycle comprising:
a frame;
an adjusting device adjusting a height of a front wheel suspension, wherein said adjusting device comprises a double-acting piston/cylinder assembly with a first cylinder chamber and a second cylinder chamber separated by a piston that is connected to a piston rod, said two cylinder chambers being filled with compressible gas, and said two cylinder chambers being connectable with one another via a fluid channel, and said piston rod mounted on a telescopic front fork assembly;
a shut-oft device positioned in said fluid channel, and wherein said shut-off device is actuatable via an actuator that is spaced apart from said shutoff device.

5. The bicycle of claim 4 wherein said compressible gas comprises air.

6. The bicycle of claim 4 wherein said actuator is arranged in a region of a handle bar.

7. A bicycle having a suspension unit with an adjusting device adjusting the height of the front wheel, comprising a double acting piston cylinder assembly having a first and a second chamber filled with compressible gas and separated by a piston, and being connectable via a fluid channel to adjust the height, where a shut-off device is located in the fluid channel that is actuatable via an actuator that is spaced apart from said shut-off device.

8. The bicycle of claim 7 wherein said compressible gas comprises air.

9. The bicycle of claim 7 wherein said actuator is arranged in a region of a handle bar.

* * * * *

UNITED STATES PATENT AND TRADEMARK OFFICE
CERTIFICATE OF CORRECTION

PATENT NO. : 7,017,928 B2
APPLICATION NO. : 10/675389
DATED : March 28, 2006
INVENTOR(S) : Felsl et al.

It is certified that error appears in the above-identified patent and that said Letters Patent is hereby corrected as shown below:

Title Page:

(76) Inventors:

Delete "Andreas Felsl, Zugspitzstrasse 10, Haar/Gronsdorf, D-85540 (DE);" and

Insert --Andreas Felsl, Zugspritzstraße 10, Haar/Gronsdorf, D-85540 (DE);--

Claims

Claim 7

Col. 18, line 10, delete the word "actuatable" and insert --actuateable--

Signed and Sealed this

Twenty-second Day of August, 2006

JON W. DUDAS
*Director of the United States Patent and Trademark Office*